United States Patent
Chang

(10) Patent No.: US 10,139,303 B2
(45) Date of Patent: Nov. 27, 2018

(54) CALIBRATING DEVICE FOR MEASURING AND CALIBRATING THE CENTER OF GRAVITY OF A REMOTE CONTROL AIRCRAFT OR AN AIRFOIL THEREOF

(71) Applicant: FONG BONG ENTERPRISE CO., LTD., Kaohsiung (TW)

(72) Inventor: Wen-Liang Chang, Kaohsiung (TW)

(73) Assignee: Fong Bong Enterprise Co., Ltd., Kaohsiung (TW)

( * ) Notice: Subject to any disclaimer, the term of this patent is extended or adjusted under 35 U.S.C. 154(b) by 213 days.

(21) Appl. No.: 15/149,224

(22) Filed: May 9, 2016

(65) Prior Publication Data

US 2017/0322101 A1    Nov. 9, 2017

(51) Int. Cl.
*G01M 1/12* (2006.01)
*B64F 5/00* (2017.01)

(52) U.S. Cl.
CPC ........... *G01M 1/125* (2013.01); *B64F 5/0045* (2013.01)

(58) Field of Classification Search
CPC ..................................................... G01M 1/125
IPC ..................................................... A63H 27/18
See application file for complete search history.

(56) References Cited

U.S. PATENT DOCUMENTS

| | | | | |
|---|---|---|---|---|
| 2,686,426 A | * | 8/1954 | Kolisch | G01G 19/07 235/61 T |
| 2,735,291 A | * | 2/1956 | Quinn | G01G 19/07 235/61 T |
| 2,872,807 A | * | 2/1959 | Kolisch | G01G 19/07 177/210 R |
| 2,932,188 A | * | 4/1960 | Kennedy, Jr. | G01G 19/07 235/61 P |
| 2,979,256 A | * | 4/1961 | Cushman | G01G 19/07 235/61 A |
| 3,584,503 A | * | 6/1971 | Senour | G01G 19/07 340/666 |
| 4,935,885 A | * | 6/1990 | McHale | G01G 19/02 177/199 |
| 5,583,777 A | * | 12/1996 | Power | G01G 19/025 177/199 |

(Continued)

FOREIGN PATENT DOCUMENTS

| CN | 203620244 U | * | 6/2014 |
|---|---|---|---|
| CN | 104415549 A | * | 3/2015 |

*Primary Examiner* — David Bolduc
(74) *Attorney, Agent, or Firm* — Alan D. Kamrath; Kamrath IP Lawfirm, P.A.

(57) ABSTRACT

A calibrating device, for measuring and calibrating a center of gravity of a remote control aircraft or an airfoil thereof, includes a crossbar, a first support, a second support and a control unit. The crossbar is arranged along a longitudinal axis, and includes a longitudinal rail and a slider. The slider is movably engaged with the longitudinal rail. The crossbar includes a drive member coupled with the longitudinal rail or the slider. The slider includes a pointer. The first support includes a seat and two receiving portions which are arranged on the seat and are movable along a transverse axis. The receiving portions are aligned with each other. Each receiving portion includes a load cell. The second support includes a base and a supporting portion, and the supporting portion includes a load cell. The control unit is coupled with the drive member and the three load cells.

22 Claims, 16 Drawing Sheets

(56) References Cited

U.S. PATENT DOCUMENTS

| | | | | |
|---|---|---|---|---|
| 5,750,937 | A * | 5/1998 | Johnson | G01G 23/3707 177/199 |
| 9,026,350 | B1 * | 5/2015 | Knaus | G01M 1/125 701/124 |
| 9,061,763 | B1 * | 6/2015 | Christensen | A63H 17/28 |
| 9,550,561 | B1 * | 1/2017 | Beckman | B64C 17/00 |
| 9,656,749 | B1 * | 5/2017 | Hanlon | B64C 39/024 |
| 2008/0131248 | A1 * | 6/2008 | Friz | B66C 13/04 414/561 |
| 2010/0121560 | A1 * | 5/2010 | Vetsch | G01M 1/125 701/124 |
| 2011/0084162 | A1 * | 4/2011 | Goossen | B64C 39/024 244/12.1 |
| 2013/0092456 | A1 * | 4/2013 | Laird | G01G 19/00 177/1 |
| 2013/0192903 | A1 * | 8/2013 | Dubois | G01G 7/02 177/1 |
| 2013/0340511 | A1 * | 12/2013 | Miller | G01G 19/07 73/65.05 |
| 2015/0316438 | A1 * | 11/2015 | Nance | G01M 1/125 701/3 |

* cited by examiner

CALIBRATING DEVICE FOR MEASURING AND CALIBRATING THE CENTER OF GRAVITY OF A REMOTE CONTROL AIRCRAFT OR AN AIRFOIL THEREOF

BACKGROUND OF THE INVENTION

1. Field of the Invention

The present invention generally relates to a calibrating device for measuring and calibrating the center of gravity of a remote control aircraft or an airfoil thereof and, more particularly, to a calibrating device that measures the instant location of the center of gravity of a remote control aircraft or an airfoil thereof and accordingly adjusts the location of the center of gravity of the remote control aircraft or the airfoil thereof.

2. Description of the Related Art

The location of the center of gravity of an aircraft largely affects the balance, operability and safety of the aircraft. Therefore, some advanced aircraft, such as airplanes or helicopters, are often equipped with calibrating devices that are used to measure and calibrate the locations of the centers of gravity. Some advanced aircraft are even equipped with the calibrating devices that can dynamically adjust the locations of the centers of gravity thereof. However, model remote control aircraft or helicopters cannot be equipped with such calibrating devices due to the consideration of cost and weight. Furthermore, the flying of remote control aircraft tends to be affected by the external factors such as wind speed and humidity. As such, the calibration of the location of the center of gravity before flying of the aircraft is extremely important. If the location of the center of gravity is not properly calibrated, the flying of the aircraft will be unstable, which even causes crashing of the aircraft due to the difficulty in manipulating the aircraft.

The modern calibrating devices for measuring and calibrating the center of gravity of a remote control aircraft is mainly in a cradle type (such as Great Planes CG Machine) or a suspension type (such as Vanessa CG Machine). However, such types of the calibrating devices have the disadvantage of inconvenient use, such that they are not suitable for use with a heavier aircraft. Said types of the calibrating devices also have the disadvantages of inconvenient measuring processes and inconvenient adjustment of the location of the center of gravity, and cannot be carried to an aerodrome for use.

In light of this, FIG. 1 shows a conventional calibrating device 9 for measuring and calibrating the center of gravity of a remote control aircraft. The calibrating device 9 includes a crossbar 91, two supports 92 and a controller 93. The crossbar 91 includes a track 911 and a slider 912 capable of sliding along the track 911. The slider 912 includes a pointer 913. The supports 92 are coupled with two ends of the crossbar 91, respectively. Each of the two supports 92 is provided with a load cell that detects the supported weight of the support 92. The two supports 92 can jointly support an aircraft "P," and the controller 93 can calculate the total weight and the location of the center of gravity of the aircraft based on the detected weights supported by the two supports 92. Then, the controller 93 can control the slider 912 to slide along the track 911 in order for the pointer 913 to point to the location of the center of gravity. As such, the conventional calibrating device 9 for measuring the location of the center of gravity is able to simplify the measuring processes of the total weight and the location of the center of gravity of the remote control aircraft. Advantageously, the user is able to calibrate the location of the center of gravity of the aircraft "P" without encountering the above problems of the cradle-type and suspension-type calibrating devices.

However, since the two supports 92 respectively support the parts of the fuselage adjacent to the prow and tail of the aircraft "P," the length of the crossbar 91 approximates the length of the fuselage of the aircraft "P." In this regard, if it is desired to use the conventional calibrating device 9 with a larger-size aircraft "P" (larger length in the fuselage), the conventional calibrating device 9 will have a larger volume and weight. As a result, it would be inconvenient to carry the calibrating device 9.

Moreover, each of the two supports 92 is used as a fulcrum for supporting the aircraft "P." In this arrangement, the aircraft "P" is supported by only two fulcrums. If the user accidentally knocks against the aircraft "P" during the calibration process of the location of the center of gravity, the aircraft "P" may be overturned or even fall off the two supports 92. In light of this deficiency, each of the two supports 92 should be provided with a clamping member 921 for clamping the aircraft "P." However, the arrangement of the clamping members 921 increases the structural complexity of the calibrating device 9, and it will require extra effort to fix the aircraft "P" to the two supports 92.

Besides, although the conventional calibrating device 9 can measure the total weight and the location of the center of gravity of the aircraft "P," the calibrating device 9 is not able to measure the weight and the location of the center of gravity of the airfoil or other component of the aircraft "P." This is because the length of the crossbar 91 (the distance between the two supports 92), which is approximately the length of the fuselage, exceeds the length of the airfoil or other component of the aircraft "P." As such, the utility of the conventional calibrating device 9 is low.

In light of this, it is necessary to improve the conventional calibrating device 9.

SUMMARY OF THE INVENTION

It is therefore the objective of this invention to provide a calibrating device for measuring and calibrating a center of gravity of a remote control aircraft or an airfoil thereof. The calibrating device uses two receiving portions of the first support to respectively support two main wheels of the remote control aircraft, and uses the supporting portion of the second support to support a fuselage of the remote control aircraft. Through the use of load cells, the supported weights of the first and second supports can be detected and added to calculate a total weight and the location of the center of gravity of the remote control aircraft. Based on the calculated results, the pointer of the crossbar can slide to a location where the pointer points to the location of the center of gravity of the remote control aircraft.

In an embodiment of the invention, a calibrating device for measuring and calibrating a center of gravity of a remote control aircraft or an airfoil thereof is disclosed. The calibrating device includes a crossbar, a first support, a second support and a control unit. The crossbar is arranged along a longitudinal axis, and includes a longitudinal rail and a slider movably engaged with the longitudinal rail. The longitudinal rail is arranged in an extending direction of the crossbar. The crossbar further includes a drive member coupled with the longitudinal rail or the slider and driving the slider to move along the longitudinal rail. The slider includes a pointer. The first support includes a seat, two receiving portions and an auxiliary support. The two receiving portions are arranged on the seat and are movable along a transverse axis perpendicular to the longitudinal axis. The two receiving portions are aligned with each other along the transverse axis. Each of the two receiving portions includes a load cell. The auxiliary support is detachably arranged on the two receiving portions. The second support includes a base and a supporting portion arranged on the base, and the supporting portion includes a load cell. The control unit is electrically coupled with the drive member of the crossbar, the two load cells of the first support, and the load cell of the second support.

In another embodiment of the invention, a calibrating device for measuring and calibrating a center of gravity of a remote control aircraft or an airfoil thereof is disclosed. The crossbar is arranged along a longitudinal axis, and includes a longitudinal rail and a slider movably engaged with the longitudinal rail. The longitudinal rail is arranged in an extending direction of the crossbar. The slider includes a pointer. The crossbar further includes a scale ruler arranged along the longitudinal rail. The first support includes a seat, two receiving portions and an auxiliary support. The two receiving portions are arranged on the seat and are movable along a transverse axis perpendicular to the longitudinal axis. The two receiving portions are aligned with each other along the transverse axis. Each of the two receiving portions includes a load cell. The auxiliary support is detachably arranged on the two receiving portions. The second support includes a base and a supporting portion arranged on the base, and the supporting portion includes a load cell. The control unit is electrically coupled with the drive member of the crossbar, the three load cells of the first and second supports, and an output device.

In a form shown, the crossbar is located at a center between the two receiving portions along the transverse axis. As such, when the two main wheels of the remote control aircraft are placed on the two receiving portions and the fuselage of the aircraft is placed on the second support, the fuselage of the aircraft can be aligned with the longitudinal axis.

In the form shown, the two receiving portions of the first support are adapted to respectively support two main wheels of the remote control aircraft. The supporting portion of the second support is adapted to support a fuselage of the remote control aircraft. The control unit receives and adds weight information of the three load cells of the first and second supports to calculate a total weight of the remote control aircraft, and the control unit calculates the location of the center of gravity of the remote control aircraft. The calculated result of the total weight and location of the center of gravity can be outputted through the output device. As such, the control unit can instantly output the calculated result of the total weight and location of the center of gravity of the remote control aircraft for the user's calibration.

In the form shown, the remote control aircraft has a tail wheel landing gear where the portion of the fuselage of the aircraft between the two main wheels and the tail is placed on the supporting portion of the second support. In this arrangement, since the location of the center of gravity of the remote control aircraft with the tail wheel landing gear is located between the main wheels and the rear edges of the airfoils, the calibrating device can be used by any aircraft with the tail wheel landing gear.

In another form shown, the remote control aircraft has a nose wheel landing gear where the portion of the fuselage of the aircraft between the two main wheels and the nose is placed on the supporting portion of the second support. In this arrangement, since the location of the center of gravity of the remote control aircraft with the nose wheel landing gear is located between the main wheels and the front edges of the airfoils, the calibrating device can be used by any aircraft with the nose wheel landing gear.

In the form shown, the first and second supports are spaced from each other along the longitudinal axis in a distance larger than a distance between the location of the center of gravity and the first support along the longitudinal axis. As such, the location of the center of gravity will fall between the first and second supports, so that the remote control aircraft can be stably supported by the receiving portions of the first and second supports.

In the form shown, the auxiliary support includes two posts. Each of the two posts is detachably arranged on a respective one of the two receiving portions. A transverse bar is detachably arranged on the two posts. Alternatively, a transverse brace is detachably attached to each of the two posts, and the two transverse braces of the two posts are adapted to respectively support two airfoils of the remote control aircraft. Based on this, the supporting portion of the second support is adapted to support a fuselage of the remote control aircraft. The control unit receives and adds weight information of the three load cells of the first and second supports to calculate total weight and location of the center of gravity of the remote control aircraft. As such, the two receiving portions can be used to respectively support two main wheels of the remote control aircraft, or used to respectively support two airfoils of the remote control aircraft via the two posts. In both uses, the calibrating device can measure the total weight and location of the center of gravity of the remote control aircraft, apparently improving the utility thereof. In particular, the airfoils of the aircraft can be placed on the first support so that the position of the aircraft can be properly adjusted along the longitudinal axis. Once the aircraft is placed between the first and second supports, the location of the center of gravity of the aircraft will definitely be located between the first and second supports. As such, the aircraft can be stably supported by the two receiving portions of the first support and the supporting portion of the second support. This design is particularly suitable for the aircraft that has no wheels, such as a large-size remote control glider.

In the form shown, the pointer is coupled with the slider via a pivoting member. As such, the pointer can be perpendicular to the crossbar and can pivot from the location of the center of gravity of the aircraft by an angle to point to a reference point on the airfoil or the fuselage. As such, the location of the center of gravity of the aircraft can be calibrated.

In the form shown, the pointer is a laser transmitter. As such, the laser transmitter is able to generate a laser beam that indicates the location of the center of gravity on the fuselage of the aircraft.

In the form shown, a level is arranged on a surface of the crossbar. As such, the level can indicate whether the crossbar is horizontal along the longitudinal axis. If not, the user can adjust the crossbar in the horizontal state.

In the form shown, the calibrating device further includes a bottom frame, and the crossbar further includes a height adjustment member abutting against the bottom frame to adjust a height of the crossbar. As such, the bottom frame can be placed on a plane to place the calibrating device of the embodiment of the invention on the plane. In this regard, if the plane is not horizontal, the user can adjust the distance between the crossbar and the bottom frame via the height adjustment portion until the crossbar is horizontal.

In the form shown, at least one positioning portion can be arranged on the surface of each receiving portion of the first support. The at least one positioning portion is arranged on at least one edge of the receiving portion parallel to the transverse axis. Therefore, when the main wheel of the aircraft is placed on the receiving portion, the at least one positioning portion can effectively position the main wheel, preventing the main wheel from rolling on the surface of the receiving portion.

In the form shown, the auxiliary support of the first support further includes a transverse bar. The second support and the transverse bar are adapted to support the airfoil of the remote control aircraft. The control unit receives and adds weight information of the three load cells of the first and second supports to calculate a total weight of the airfoil, and calculates the location of the center of gravity of the airfoil. The calculated total weight and location of the center of gravity can be outputted through the output device. As such, the control unit can instantly output the result of the weight and location of the center of gravity of the airfoil, to calculate the moment of inertia of the airfoil with respect to a central axis of the aircraft. Advantageously, the user is able to also calibrate the weight, the location of the center of gravity, and the moment of inertia of the airfoil, thereby adjusting the moment of inertia of the airfoil in a desired value. Therefore, the utility of the calibrating device of the embodiment of the invention can be improved.

In the form shown, the transverse bar of the auxiliary support further includes a gauge and a slider slidably coupled with the gauge. The gauge is disposed relatively adjacent to the first support and relatively distant to the second support along the longitudinal axis. A root of the airfoil abuts against the slider of the transverse bar. The gauge is provided with graduations showing a distance between the slider of the transverse bar and the first support. As such, the distance between the location of the center of gravity of the airfoil and the central axis can be obtained by adding the distance between the slider of the transverse bar and the first support, the distance between the location of the center of gravity and the first support, and half of the width of the fuselage of the aircraft. Advantageously, convenient calculation of the moment of inertia is provided.

In the form shown, the supporting portion of the second support is provided with a height adjustment portion. As such, the height of the supporting portion can be adjusted in the same level as the transverse bar through the height adjustment portion. Advantageously, the aircraft can be laid horizontally when placed on the first and second supports, increasing the accuracy in measuring the location of the center of gravity and the moment of inertia of the airfoil.

In the form shown, the drive member is coupled with a belt in order to drive the belt to rotate. The belt is arranged along the longitudinal rail and coupled with the slider. As such, the drive member can drive the belt to rotate in the clockwise or counterclockwise direction, to drive the slider to move back and forth along the longitudinal rail.

In the form shown, the longitudinal rail may be in the form of a screw rod, and the slider may be in the form of a screw tube. In this arrangement, the slider is screwed to the longitudinal rail, and the drive member is coupled with the longitudinal rail in order to drive the longitudinal rail to rotate. As such, the slider can be driven to reciprocate along the longitudinal rail by the drive member driving the longitudinal rail to rotate in the clockwise or counterclockwise direction.

In the form shown, the calibrating device further includes a box having a plurality of lateral boards and a bottom board. The bottom board may be fixed to the bottom frame. Each of the plurality of lateral boards is pivotally coupled with the bottom board. A chamber is formed between the plurality of lateral boards and the bottom board. The crossbar, the first support, the second support and the control unit are received in the chamber. As such, the box can protect the crossbar, the first support, the second support, the control unit or the bottom frame from damage during transportation, thereby improving the convenience in carrying the calibrating device of the embodiment of the invention.

In the form shown, a mirror is arranged on one of the plurality of lateral boards or arranged between two opposite lateral boards of the plurality of lateral boards. The mirror faces the chamber. As such, the mirror can reflect the bottom image of the aircraft (or the airfoil), allowing the user to view the indicated location of the center of gravity of the aircraft (or the airfoil) from the above. Advantageously, the user does not have to stoop so low to check under the aircraft (or the airfoil) for the location of the center of gravity, improving the utility of the calibrating device.

In the above structures, the calibrating device of the embodiment of the invention uses two receiving portions of the first support to respectively support two main wheels or two airfoils of an aircraft, and uses the supporting portion of the second support to support a fuselage of the aircraft. Thus, the aircraft can be properly supported, and the length of the crossbar can be reduced. This advantageously reduces the overall volume and weight of the calibrating device, improving the convenience in carrying the calibrating device. Furthermore, since the two receiving portions of the first support and the supporting portion of the second support are used as three fulcrums to support the aircraft, it does not need to use the clamping member to fix the aircraft. Thus, the production process of the calibrating device is simplified, and the utility of said calibrating device is improved. Besides, the calibrating device according to the embodiment of the invention can be used by various aircraft with different sizes without having to change the length of the crossbar. This further simplifies the production process of the calibrating device and improves the utility of said calibrating device.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
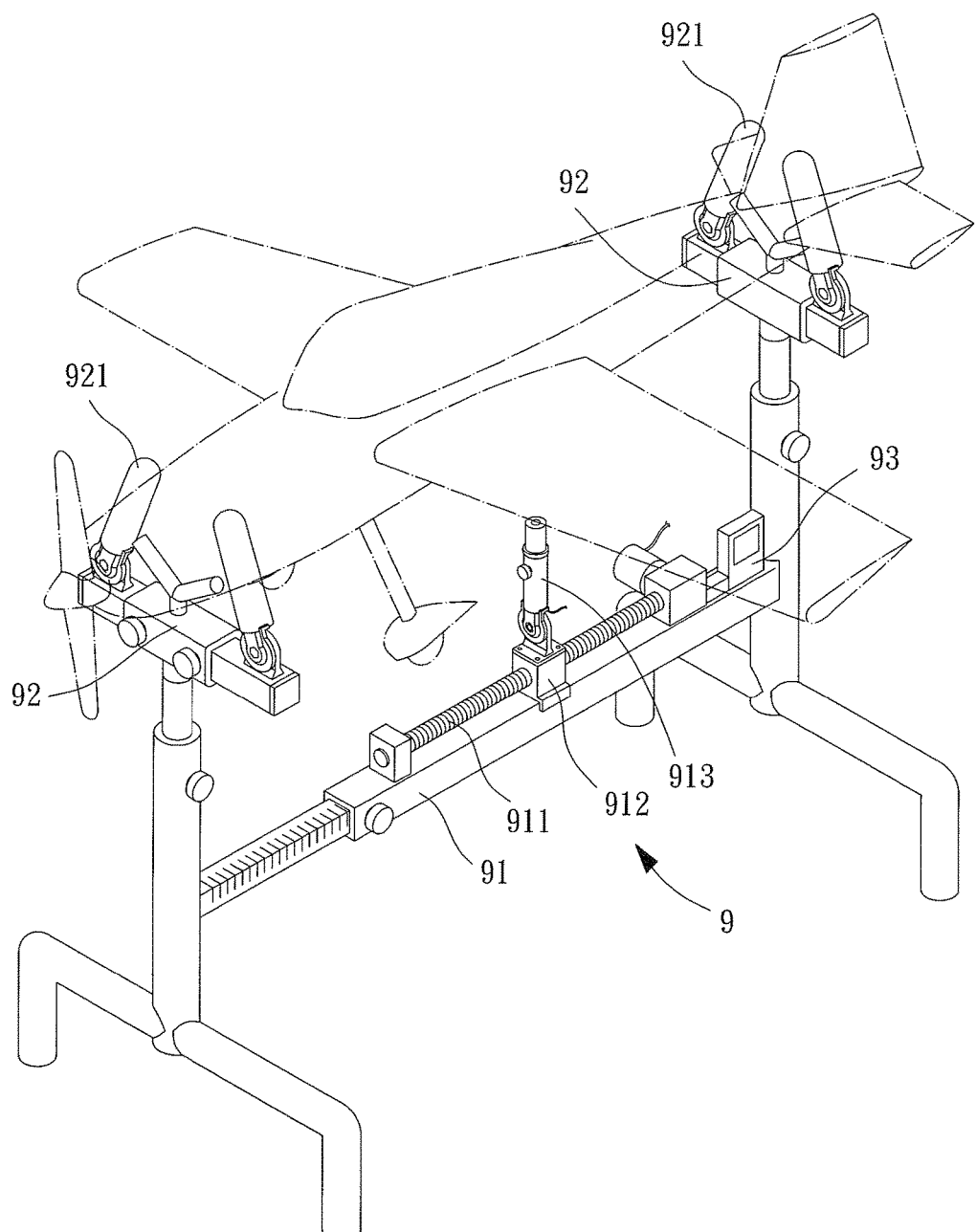
FIG. 1 shows a conventional calibrating device for measuring and calibrating the center of gravity of a remote control aircraft.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The term "couple" used hereinafter refers to the linkage between two devices through the use of a wired medium, a wireless medium or the combination thereof (such as a heterogeneous network) for data transmission purposes, as it can be readily appreciated by the persons skilled in the art.

Figure 2:
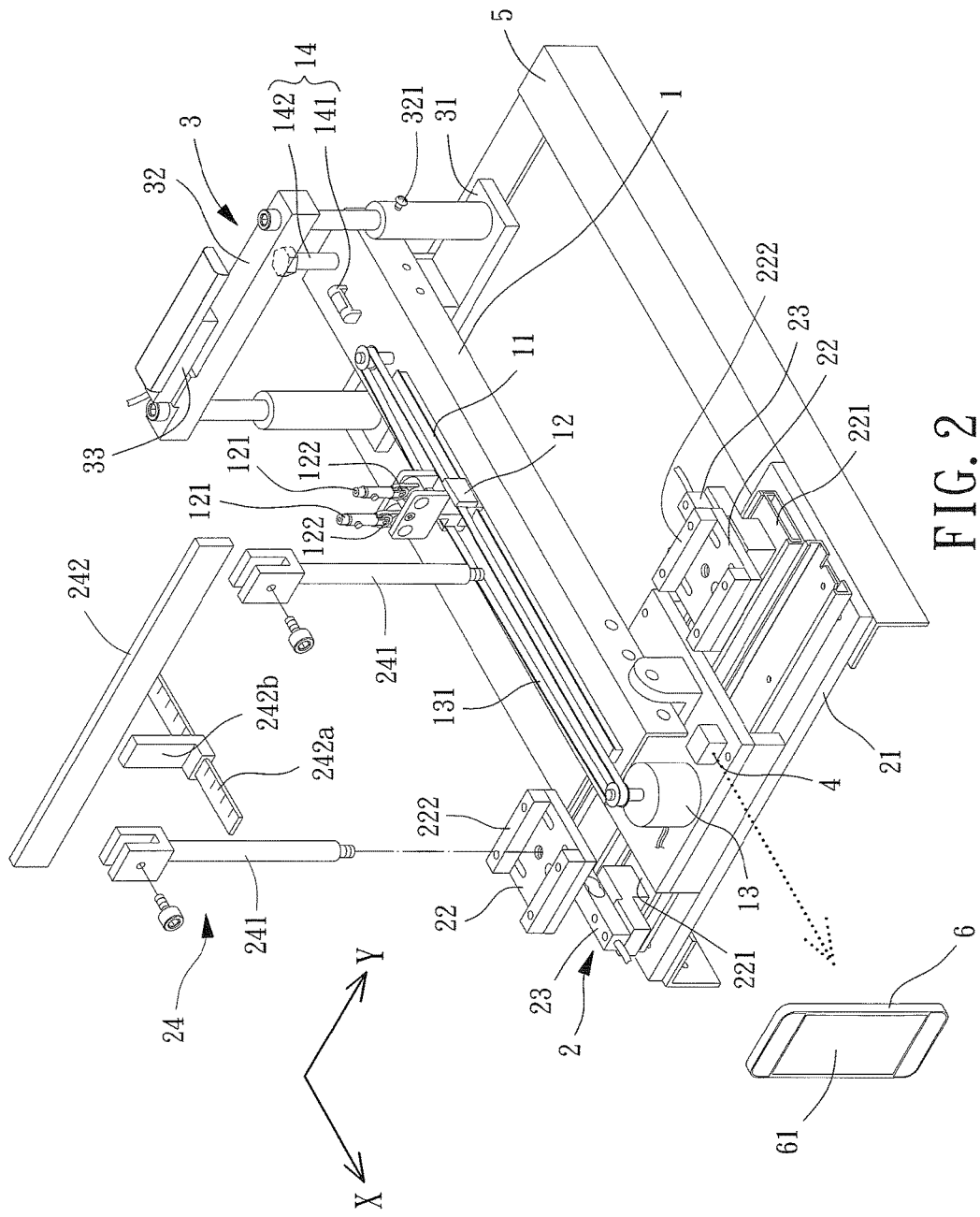
FIG. 2 is an exploded view of a calibrating device for measuring and calibrating the center of gravity of a remote control aircraft or an airfoil thereof according to an embodiment of the invention.

FIG. 2 shows a calibrating device for measuring and calibrating the center of gravity (CG) of a remote control (RC) aircraft or an airfoil thereof according to an embodiment of the invention. The center of gravity of a remote control aircraft is abbreviated to "CG of a RC aircraft" throughout the specification hereinafter. The calibrating device includes a crossbar 1, a first support 2 and a second support 3. The first support 2 and the second support 3 can be arranged at two ends of the crossbar 1, respectively.

The crossbar 1 includes a longitudinal rail 11 arranged in an extending direction of the crossbar 1, as well as a slider 12 movably engaged with the longitudinal rail 11. The slider 12 is able to move along the longitudinal rail 11. In the embodiment, the crossbar 1 further includes a drive member 13 coupled with the longitudinal rail 11 or the slider 12, to drive the slider 12 to move along the longitudinal rail 11. The crossbar 1 may be arranged in parallel to a longitudinal axis "X," such that the slider 12 can slide along the longitudinal axis "X." The drive member 13 may be a motor whose output axle is coupled with a belt 131. The belt 131 is arranged along the longitudinal rail 11 and coupled with the slider 12. In this arrangement, the drive member 13 is able to drive the belt 131 to rotate. When the drive member 13 drives the belt 131 to rotate in the clockwise or counterclockwise direction, the slider 12 may move back and forth along the longitudinal rail 11.

Figure 3:
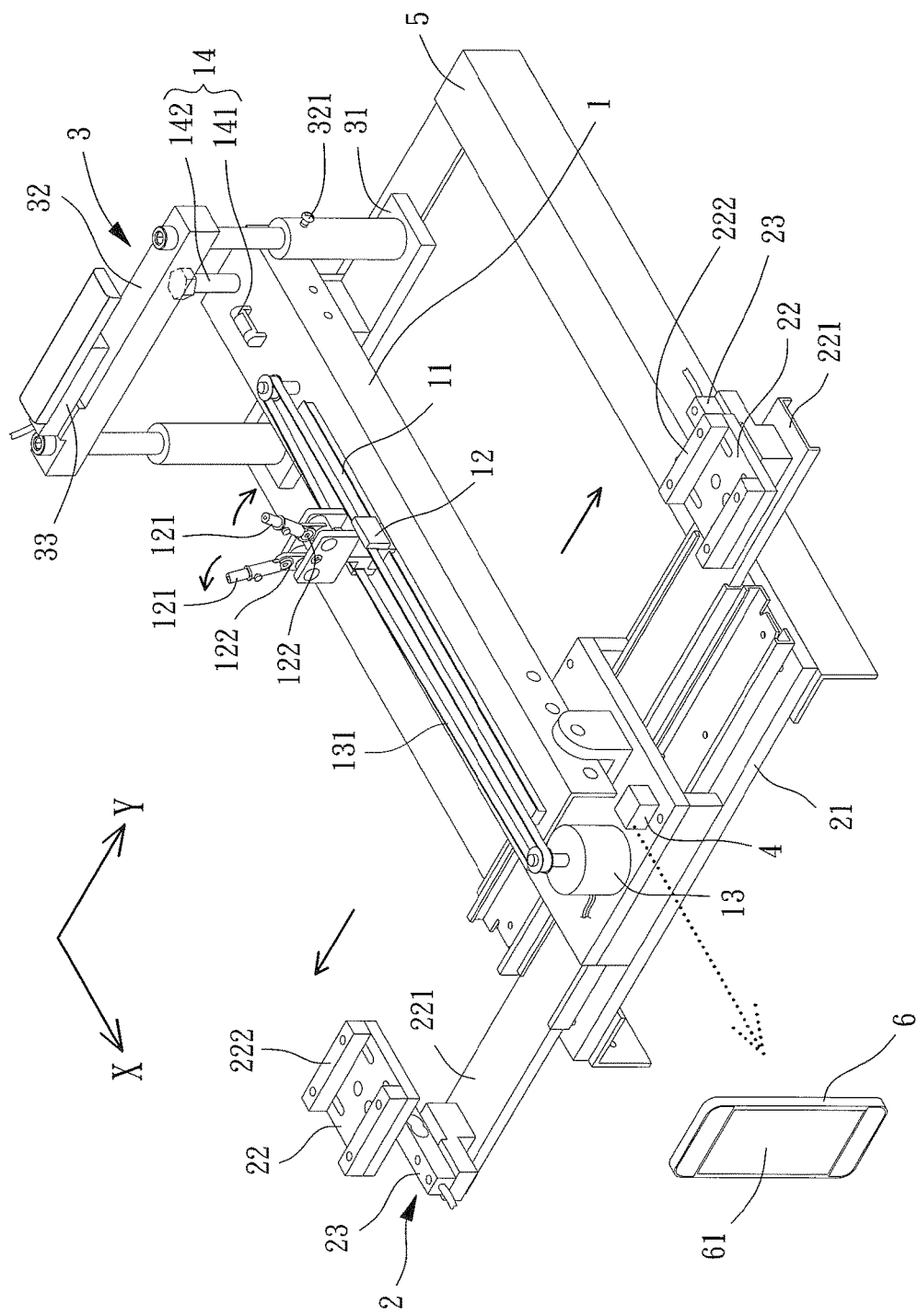
FIG. 3 is another view of the calibrating device of the embodiment of the invention where two receiving portions move away from each other in opposite directions.

Referring to FIG. 3 also, the slider 12 includes a pointer 121. The pointer 121 may be in a cylindrical form and may have a reduced diameter at an end thereof for pointing to a certain direction. Alternatively, in the embodiment, the pointer 121 may be a laser transmitter that emits a laser beam towards a certain direction for indication purposes. The pointer 121 may be coupled with the slider 12 via a pivoting member 122, so that the pointer 121 can pivot about the crossbar 1. The pointer 121 is preferably perpendicular to the crossbar 1 while pivoting about the crossbar 1.

The first support 2 includes a seat 21 and two receiving portions 22. The seat 21 may be fixed to one end of the crossbar 1. The two receiving portions 22 are mounted on the seat 21 and are movable along a transverse axis "Y" perpendicular to the longitudinal axis "X." The two receiving portions 22 are aligned with each other along the transverse axis "Y." Specifically, as shown in FIGS. 2 and 3, each of the two receiving portions 22 may be coupled with a transverse rail 221. The transverse rail 221 is movably engaged with the seat 21 along the transverse axis "Y." The two receiving portions 22 may be moved towards and away from each other on the seat 21, such that the user is able to adjust the distance between the two receiving portions 22. In addition, when one receiving portion 22 moves along the transverse axis "Y," the other one moves in an opposite direction. Thus, the crossbar 1 can remain at the center between the two receiving portions 22 along the transverse axis "Y." The adjustment may be made by the user. In another option, a transmission mechanism such as gear wheels or racks may be arranged on the two transverse rails 221 to provide an interconnection between the two receiving portions 22. As such, when the user moves one receiving portion 22 in a direction, the other receiving portion 22 may be moved the same distance in another direction, as it can be readily appreciated by the persons having ordinary skill in the art. Each of the two receiving portions 22 includes a load cell 23.

The second support 3 includes a base 31 and a supporting portion 32. The base 31 may be fixed to another end of the crossbar 1. The supporting portion 32 is mounted on the base 31 and may include a load cell 33.

The calibrating device of the embodiment of the invention further includes a control unit 4. The control unit 4 may be a microcontroller unit (MCU) or any of other conventional calculation calibrating devices. The control unit 4 is electrically coupled with the drive member 13, the two load cells 23 of the first support 2, and the load cell 33 of the second support 3, to receive the weight information of the load cells 23 and 33. The first support 2 and the second support 3 can jointly support a measured object. The control unit 4 is able to calculate the total weight and CG location of the object according to the weight information of the load cells 23 and 33. Based on the calculated results, the control unit 4 can control the drive member 13 to drive the slider 12, so that the slider 12 will slide along the longitudinal rail 11 to point out the CG location of the object.

Figure 4:
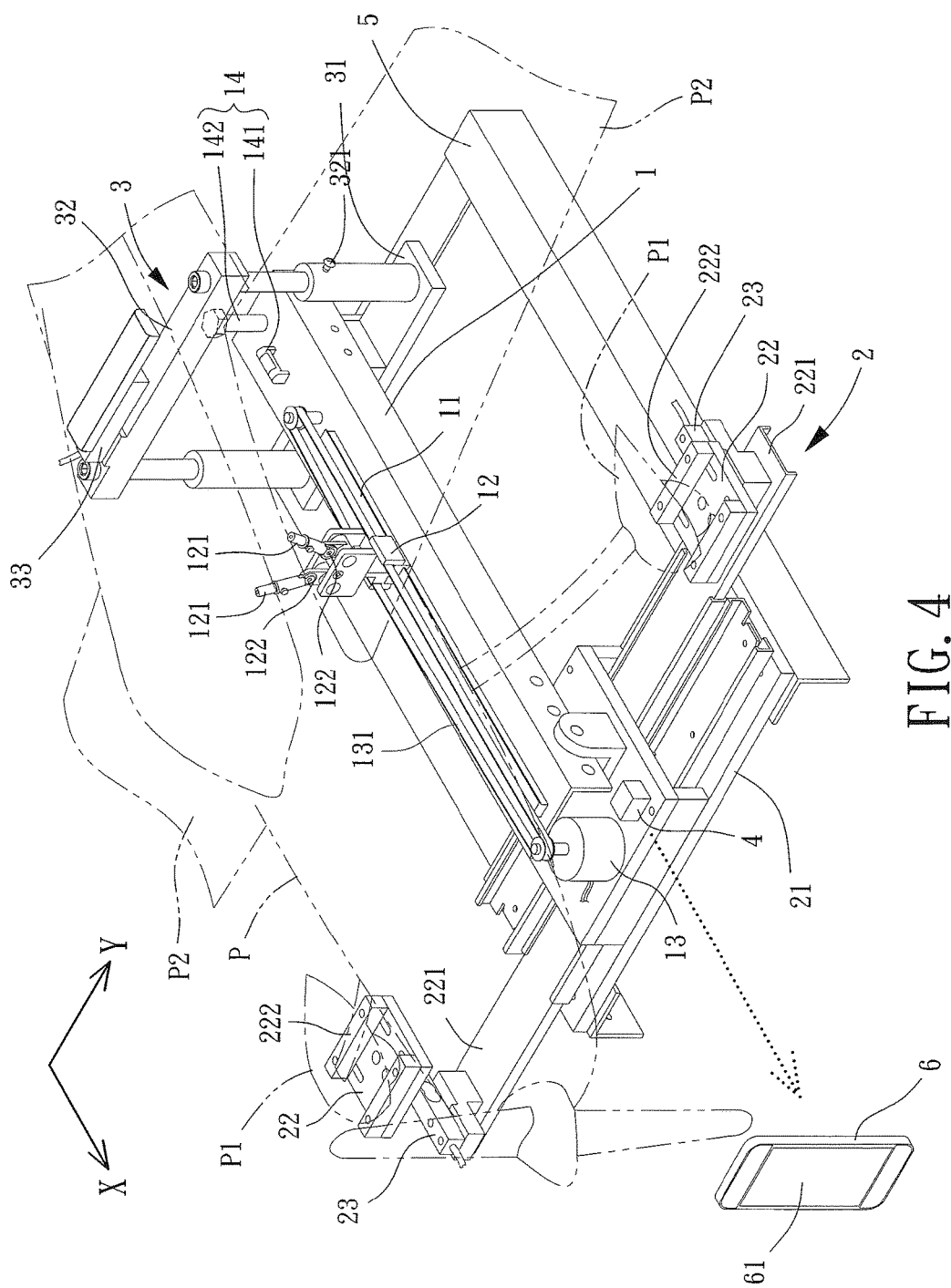
FIG. 4 shows the calibrating device of the embodiment of the invention when used to support an aircraft.

FIG. 4 shows the use of the calibrating device for measuring and calibrating the CG location of the RC aircraft or an airfoil thereof according to the embodiment of the invention. The calibrating device can be placed on a plane surface via the seat 21 of the first support 2 and the base 31 of the second support 3. However, in the embodiment, the calibrating device further includes a bottom frame 5. The crossbar 1 may be mounted on the bottom frame 5, and the bottom frame 5 may be placed on a plane. The first support 2 and the second support 3 may support an aircraft, which may be a conventional remote control aircraft or helicopter. As an example of an aircraft "P" with a tail wheel, the aircraft "P" includes two main wheels P1 and a tail wheel (not shown). In this regard, the user can adjust the distance between the two receiving portions 22 of the first support 2, so that the distance between the receiving portions 22 is equal to that between the two main wheels P1 along the transverse axis "Y." Therefore, the two main wheels P1 can be placed on the two receiving portions 22, respectively. Then, the portion of the aircraft "P" between the two main wheels P1 and the tail can be placed on the supporting portion 32 of the second support 3, in order for the airfoils P2 of the aircraft "P" to be partially or fully located between the first support 2 and the second support 3 along the transverse axis "Y." Based on the above, the central axis of the fuselage of the aircraft "P" can be aligned with the longitudinal axis "X."

Figure 5:
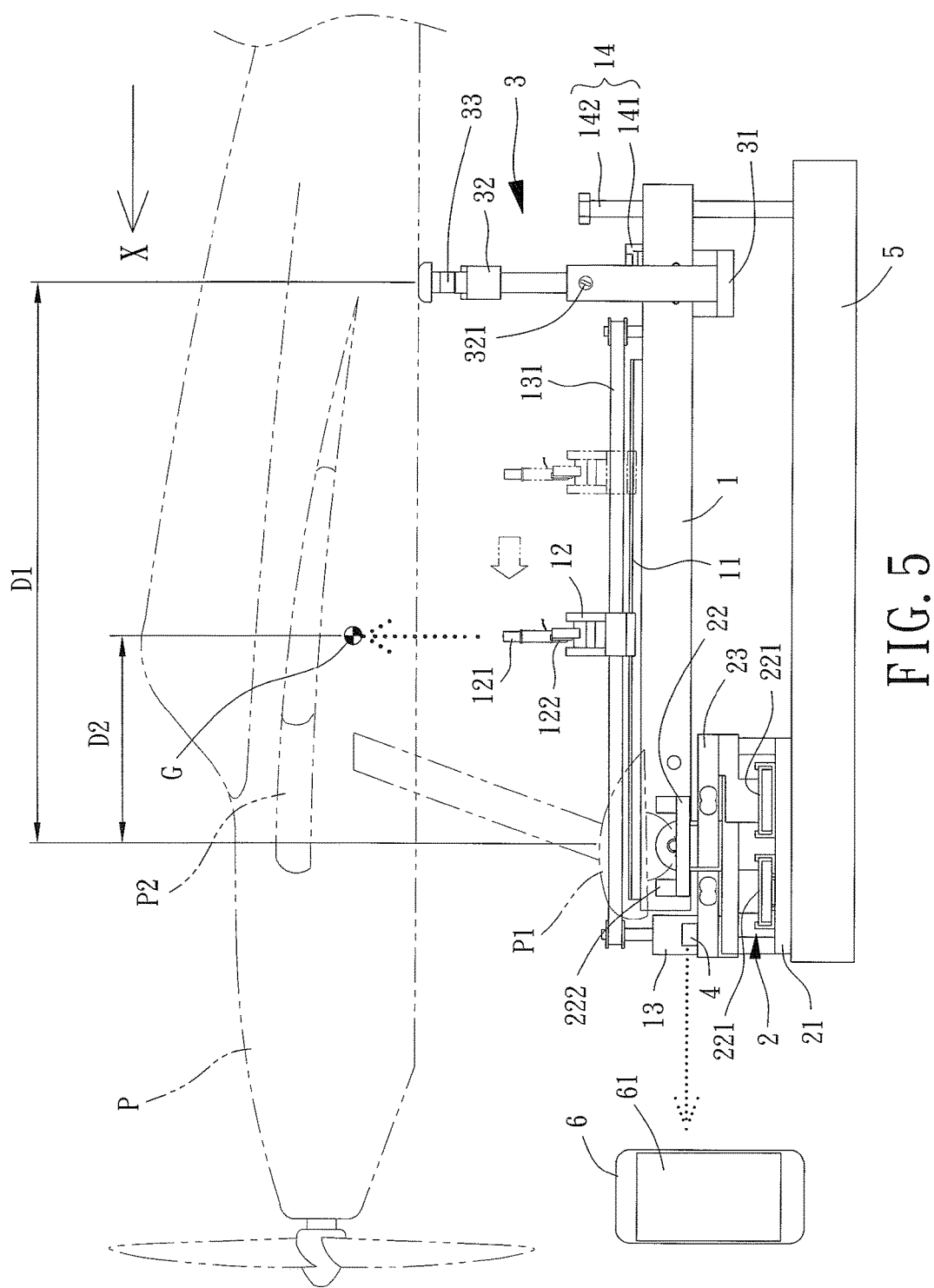
FIG. 5 is a side view of the calibrating device of the embodiment of the invention when used to support the aircraft.

FIG. 5 shows the aircraft "P" with the tail wheel. In this arrangement, the CG location "G" of the aircraft "P" is behind the two main wheels P1. Namely, the CG location "G" of the aircraft "P" is located between the main wheels P1 and the rear edges of the airfoils P2. Based on this, the distance between the first support 2 and the second support 3 simply needs to be larger than the distance between the first support 2 and the CG location "G" in the longitudinal axis "X," such that the CG location "G" can fall between the first support 2 and the second support 3. As a result, the aircraft "P" can be stably supported by the two receiving portions 22 of the first support 2 and the supporting portion 32 of the second support 3.

The total weight of the aircraft "P" is supported by the first support 2 and the second support 3. The information regarding the supported weight of the first support 2 is sent to the two load cells 23 of the two receiving portions 22. Thus, the two load cells 23 are able to jointly measure the weight supported by the first support 2. Likewise, the information regarding the supported weight of the second support 3 is sent to the load cell 33 of the supporting portion 32. Thus, the load cell 33 is able to measure the weight supported by the second support 3. The control unit 4 receives and adds the detected weights of the load cells 23 and 33 to calculate the total weight "W" of the aircraft "P."

Since the distance D1 between the first support 2 and the second support 3 is known, the control unit 4 is able to calculate the distance D2 between the CG location "G" of the aircraft "P" and the first support 2 based on the following equation:

$$D2=(F\times D1)\div W \quad (1).$$

In the above equation, "F" represents the supported weight of the second support 3, which may be detected by the load cell 33 of the supporting portion 32. Likewise, the control unit 4 can obtain the same result based on the supported weight of the first support 2 (as detected by the load cells 23 of the two receiving portions 22). The invention is not limited to either approach. In other words, based on the detected weights of the load cells 23 and 33, the distance D2 between the CG location "G" of the aircraft "P" and the first support 2 can be calculated. Since the control unit 4 is able to calculate the distance D2 between the CG location "G" of the aircraft "P" and the first support 2, the distance D1-D2 between the CG location "G" of the aircraft "P" and the second support 3 can also be calculated. As such, the control unit 4 is able to measure the CG location "G" of the aircraft "P."

Referring to FIG. 5, after the CG location "G" of the aircraft "P" is calculated, the control unit 4 controls the drive member 13 in order to drive the slider 12 to move to the CG location along the longitudinal rail 11. As such, the pointer 121 of the slider 12 can point to the CG location "G" of the aircraft "P." Since the pointer 121 is a laser transmitter in the embodiment, the pointer 121 can project a laser beam to the CG location "G" of the aircraft "P" or to the CG location of the airfoil P2. The laser beam that is projected onto the aircraft "P" serves as an indication of the CG location.

Since the aircraft manufacturer can mark the default CG location on the fuselage or airfoil of the aircraft "P" (which is usually in a range), the user can compare the measured CG location "G," which is indicated by the pointer 121, with the default CG location of the original design for calibration purposes. Besides, the control unit 4 may be coupled with an output device 6. The instant information of the total weight and CG location "G" can be sent to the output device 6. The output device 6 may be a display, a computer screen or a cellular phone panel for displaying the total weight "W" and CG location "G" for the user's calibration.

Thus, the user is able to view the CG location "G" of the aircraft "P" through the guidance of the pointer 121. If the CG location "G" of the aircraft "P" is improper, the CG location "G" can be calibrated by changing the weight or location of the battery or the oil tank, or by adding the weight(s) without having to remove the aircraft "P" from the first support 2 and the second support 3. In addition, the control unit 4 can repeat the above steps so that the pointer 121 can constantly point to the CG location "G" of the aircraft "P." As such, the CG location "G" of the aircraft "P" can be properly calibrated in a convenient manner. Furthermore, the user is also able to view the values on the output device 6 regarding the total weight "W" and CG location "G" of the aircraft "P." Based on the displayed values, the CG location "G" can be calibrated. Therefore, the calibrating device according to the embodiment of the invention is provided with a complete measuring function for measuring the weight and CG location of a measured object.

As stated before, since the conventional calibrating device 9 uses two supports 92 to support the parts of the fuselage adjacent to the prow and tail of the aircraft "P," the conventional calibrating device 9 has a disadvantage that the length of the crossbar 91 is approximately the length of the fuselage of the aircraft "P." In comparison with the conventional calibrating device 9, the crossbar 1 of the calibrating device of the embodiment of the invention can have a significantly smaller length than that of the fuselage of the aircraft "P." This is because the calibrating device of the embodiment of the invention uses two receiving portions 22 of the first support 2 to support the two main wheels P1 of the aircraft "P," and uses the supporting portion 32 of the second support 3 to support the fuselage of the aircraft "P." In this regard, as long as the distance D1 between the first support 2 and the second support 3 is larger than the distance D2 between the first support 2 and the CG location "G" in the longitudinal axis "X," it can be ensured that the CG location "G" of the aircraft "P" will fall between the first support 2 and the second support 3. As a result, the aircraft "P" can be stably supported by the two receiving portions 22 of the first support 2 and the supporting portion 32 of the second support 3.

Moreover, since the receiving portions 22 of the first support 2 support the two main wheels P1 and the supporting portion 32 of the second support 3 supports the fuselage of the aircraft "P," the aircraft "P" is supported by three fulcrums. There are total 3 supports of the aircraft "P" in total. Hence, the first support 2 and the second support 3 can stably support the aircraft "P." If the user accidentally knocks against the aircraft "P" during the calibration process, the aircraft "P" will not overturn easily and will not fall off the first support 2 and the second support 3 easily. In the conventional calibrating device 9, since the aircraft "P" is supported by only two fulcrums, the calibrating device 9 requires the clamping members 921 to clamp the aircraft "P." As compared with the conventional calibrating device 9, the calibrating device of the embodiment of the invention has a simplified structure and does not require extra structure to clamp and fix the aircraft "P." Thus, the production process of the calibrating device of the embodiment of the invention is simplified, and the utility thereof is improved.

It is noted that the moment of inertia (MOI) of the airfoil P2 with respect to a central axis "C" of the aircraft "P" will affect the flying of the aircraft "P," as it can be appreciated by the persons having ordinary skill in the art. For example, when the user manipulates the aircraft to roll, the moment of inertia may affect the rolling stability of the aircraft. If the airfoil P2 has a larger moment of inertia, the rolling control of the aircraft "P" is less sensitive, but the aircraft "P" can fly more stably in a windy condition. In light of this, it is necessary to quantify the moment of inertia of the airfoil P2 so that the user will be able to determine a proper moment of inertia to attain the desired flying performance. Assume the central axis "C" of the aircraft "P" is parallel to the longitudinal axis "X," the moment of inertia of the airfoil P2 with respect to the central axis "C" of the aircraft "P" can be expressed as:

$$I_C = W_{P2} \times D_C^2 \div 1000 \qquad (2).$$

In the above, Ic represents the moment of inertia of the airfoil P2 with respect to the central axis "C," and its unit is expressed in kg-cm2. WP2 represents the weight of the airfoil P2, and its unit is expressed in grams. DC represents the distance between the CG location of the airfoil P2 and the central axis "C" along the transverse axis "Y," and its unit is expressed in centimeters (cm).

In contrast, the conventional calibrating device 9 cannot measure the weight WP2 of the airfoil P2 and the distance DC between the CG location of the airfoil P2 and the central axis "C." This is because the length of the crossbar 91 (the distance between the two supports 92), which approximates the length of the fuselage of the aircraft "P," exceeds the length of the airfoil P2. As a result, the two supports 92 are not able to support the airfoil P2. Therefore, it is impossible to calculate the weight WP2 of the airfoil P2 and the distance DC between the CG location of the airfoil P2 and the central axis "C." Disadvantageously, it requires an extra instrument to calculate the moment of inertia Ic of the airfoil P2 with respect to the central axis "C."

Thus, based on the above descriptions, in the calibrating device of the embodiment of the invention, the distance D1 between the support 2 and the second support 3 can be designed in a value significantly smaller than the length of the airfoil P2 as long as the distance D1 is larger than the distance D2 between the CG location "G" of the aircraft "P" and the first support 2 in the longitudinal axis "X."

Figure 6:
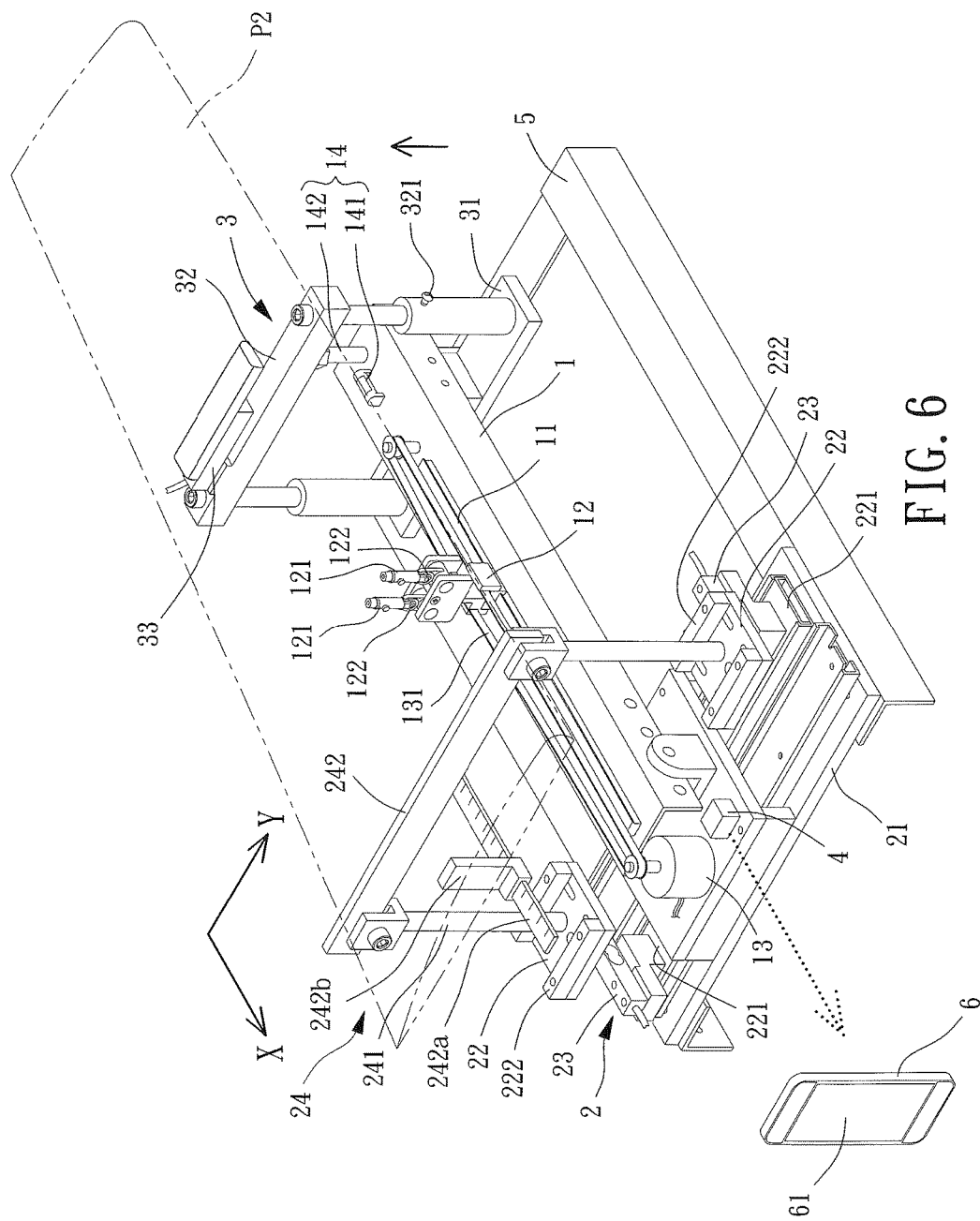
FIG. 6 shows the calibrating device of the embodiment of the invention when used to support an airfoil of the aircraft.

Based on this, the calibrating device shown in FIGS. 2 and 6 is able to measure the weight $W_{P2}$ and the CG location $G_{P2}$ of the airfoil P2. Specifically, the first support 2 further includes an auxiliary support 24 having two posts 241. Each of the two posts 241 is detachably mounted on a respective receiving portion 22, and a transverse bar 242 is mounted on the two posts 241. As shown in FIG. 6, the distance D1 between the support 2 and the second support 3 along the longitudinal axis "X" is smaller than the length of the airfoil P2 along the transverse axis "Y." Thus, the airfoil P2 can be turned by 90 degrees along the plane formed by the longitudinal axis "X" and the transverse axis "Y," and then placed on the transverse bar 242 of the auxiliary support 24 and the second support 3. The weight $W_{P2}$ of the airfoil P2 is supported by the first support 2 and the second support 3. The information regarding the weight supported by the auxiliary support 24 of the first support 2 is sent to the load cells 23 of the two receiving portions 22 through the two posts 241. Therefore, the load cells 23 are able to jointly measure the weight supported by the auxiliary support 24. Likewise, the information regarding the weight supported by the second support 3 is sent to the load cell 33. Therefore, the load cell 33 is able to measure the supported weight of the second support 3. The control unit 4 receives and adds the weight information of the load cell 23 and 33, thus obtaining the weight $W_{P2}$ of the airfoil P2.

Figure 7:
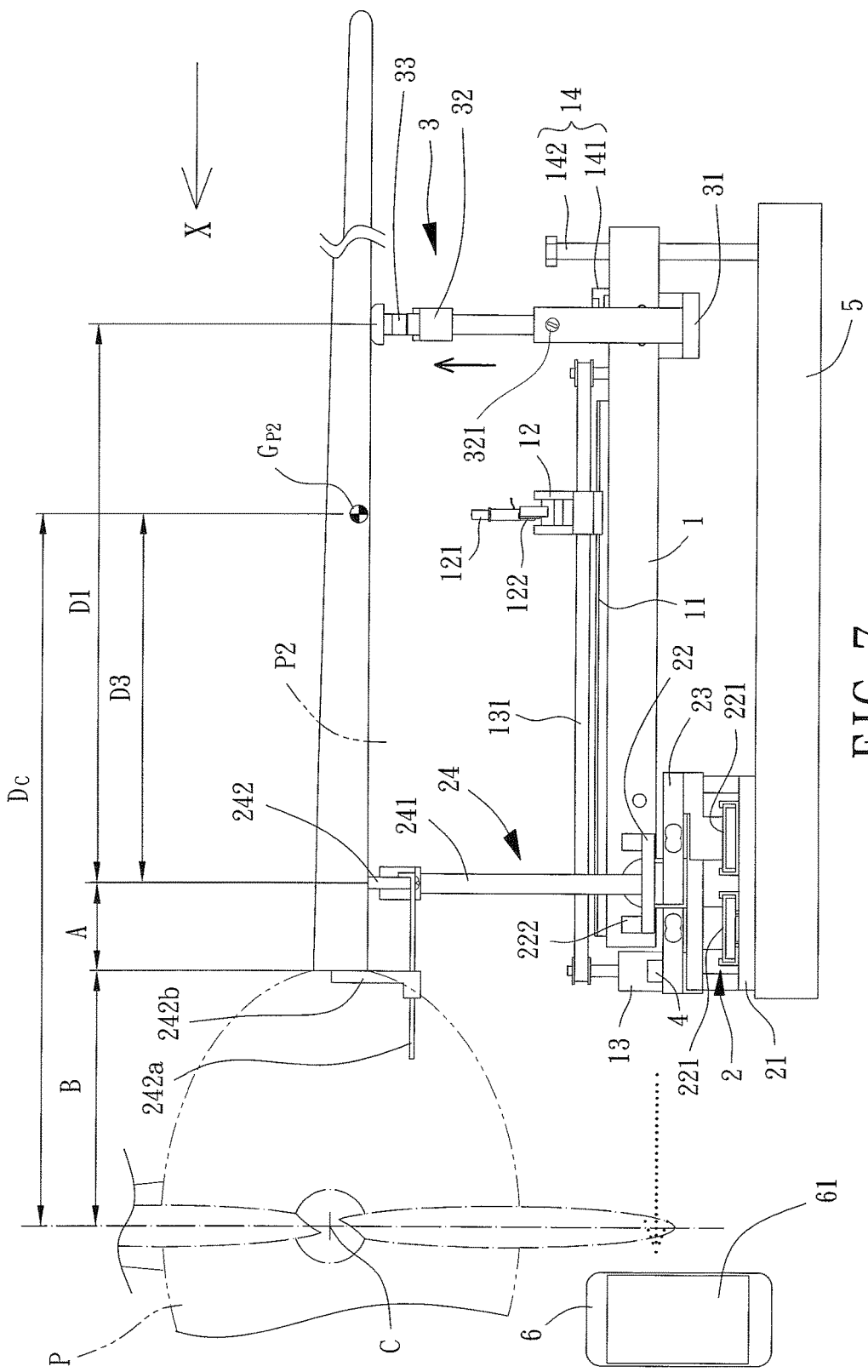
FIG. 7 is a side view of the calibrating device of the embodiment of the invention when used to support the airfoil of the aircraft.

Referring to FIG. 7 also, since the distance D1 between the first support 2 and the second support 3 is known, the control unit 4 can calculate a distance D3 between the CG location GP2 of the airfoil P2 and the first support 2 based on the following equation:

$$D3 = (F \times D1) \div WP2 \qquad (3).$$

Similarly, "F" represents the supported weight of the second support 3. Likewise, the control unit 4 can obtain the same result based on the supported weight of the first support 2 (as detected by the load cells 23 of the two receiving portions 22). The invention is not limited to either approach.

After the control unit 4 calculates the CG location $G_{P2}$ of the airfoil P2, the control unit 4 controls the drive member 13 in order to drive the slider 12 to slide along the longitudinal rail 11. As such, the pointer 121 of the slider 12 will point to the CG location $G_{P2}$ of the airfoil P2. Then, the distance between the CG location $G_{P2}$ and the root of the airfoil P2 can be calculated, and the calculated result can be added by half of the width of the fuselage "B" of the aircraft "P" (which is known) to obtain the distance $D_C$ between the CG location $G_{P2}$ of the airfoil P2 and the central axis "C." Finally, the above equation (2) can be used to calculate the moment of inertia Ic of the airfoil P2 with respect to the central axis "C."

Based on this, the user can easily repeat the above steps to determine how many weights should be added to each airfoil P2 and what locations of the airfoil P2 they should be placed, thereby calibrating the CG location of each airfoil P2. Therefore, the airfoils P2 will have less difference in the moment of inertia with respect to the central axis "C" of the aircraft "P," ensuring a stable flying of the aircraft "P." Based on this, the user can adjust the moment of inertia Ic according to weather conditions (such as wind speed), further ensuring a stable flying of the aircraft "P."

It is noted that the supporting portion 32 of the second support 3 can be provided with a height adjustment portion 321. Referring to FIGS. 6 and 7, the height adjustment portion 321 can be used to adjust the height of the supporting portion 32 in the same level as the transverse bar 242. As such, the airfoil "P2" can be laid horizontally when placed on the first support 2 and the second support 3, increasing the accuracy in measuring the CG location GP2 and the moment of inertia Ic of the airfoil P2.

Moreover, referring to FIGS. 6 and 7 also, the transverse bar 242 of the auxiliary support 24 may further include a gauge 242a and a slider 242b in order to provide a convenient calculation of the distance Dc between the CG location $G_{P2}$ of the airfoil P2 and the central axis "C." The gauge 242a is provided with graduations. The gauge 242a is relatively adjacent to the first support 2 and relatively distant to the second support 3 along the longitudinal axis "X." The slider 242b is slidably coupled with the gauge 242a. When the airfoil P2 is placed on the first support 2 and the second support 3, the root of the airfoil P2 may abut against the slider 242b, such that the distance "A" between the slider 242b (the root of the airfoil P2) and the first support 2 may be read from the gauge 242a. Since the control unit 4 already calculates the distance D3 between the CG location $G_{P2}$ of the airfoil P2 and the first support 2, the calculated distance D3 may be outputted by the output device 6. In this arrangement, the distance Dc between the CG location $G_{P2}$ of the airfoil P2 and the central axis "C" may be obtained by simply adding the distance "A" between the slider 242b and the first support 2, the distance D3 between the CG location $G_{P2}$ of the airfoil P2 and the first support 2, and half of the width of the fuselage "B" of the aircraft "P." In other words, the user does not need to spend extra effort in measuring the distance between the CG location $G_{P2}$ and the root of the airfoil P2, thus providing a convenient calculation of the moment of inertia Ic of the airfoil P2 with respect to the central axis "C."

The output device 6 may include an input unit 61, which may be a button or a touch panel. Since the value of half of the width of the fuselage "B" of the aircraft "P" is known and since the distance "A" between the slider 242b and the first support 2 can be read from the gauge 242a, the values "A" and "B" may be input to the control unit 4 through the input unit 61. As such, after the distance D3 between the CG location $G_{P2}$ of the airfoil P2 and the first support 2 is calculated, the moment of inertia Ic of the airfoil P2 with respect to the central axis "C" may be calculated based on the following equation:

$$Ic=(W_{P2}\div 1000)\times(D3+A+B)^2 \qquad (4).$$

Thus, the control unit 4 is able to calculate the moment of inertia Ic directly and instantly output the calculated result, improving the utility of the calibrating device of the embodiment of the invention.

The calibrating device of the embodiment of the invention is able to not only simplify the measuring processes of the total weight and CG location for subsequent calibration of the CG location "G" of the aircraft, but also is able to measure the weight WP2 and the CG location GP2 of the airfoil P2 for calculating the moment of inertia Ic of the airfoil P2 with respect to the central axis "C." As such, the user is also able to calibrate the weight WP2 and the CG location GP2 of the airfoil P2, thereby adjusting the moment of inertia Ic in a desired value. Therefore, the utility of the calibrating device of the embodiment of the invention can be improved.

Figure 8:
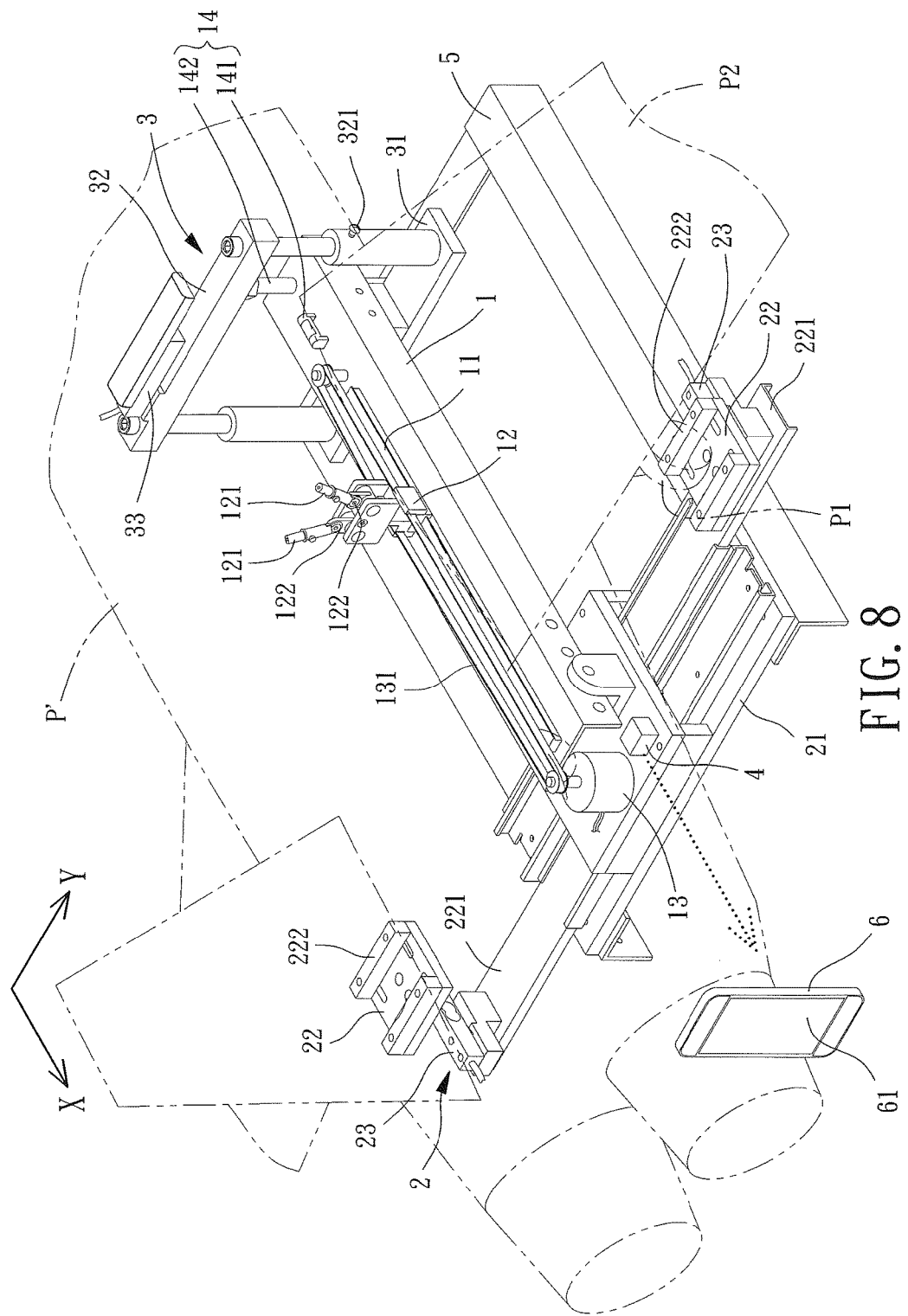
FIG. 8 shows the calibrating device of the invention when used to support another aircraft with a nose wheel.

Although the calibrating device of the embodiment of the invention is shown to be used by the aircraft "P" with the tail wheel as shown in FIGS. 4 and 5, the calibrating device can also be used by an aircraft P' with a nose wheel as shown in FIG. 8. The aircraft P' includes two main wheels P1 and a nose wheel (not shown). Likewise, the user can adjust the distance between the two receiving portions 22 of the first support 2 in order to align the central axis "C" of the aircraft "P" with the longitudinal rail on the crossbar. In this regard, the portion of the fuselage of the aircraft P' between the two main wheels P1 and the nose can be placed on the supporting portion 32 of the second support 3, so that the airfoils P2 of the aircraft P' are partially or fully located between the first support 2 and the second support 3 along the transverse axis "Y." Since the CG location "G" of the aircraft P' is before the two main wheels P1 (namely, between the two main wheels P1 and the front edges of the airfoils P2), the aircraft P' can be stably supported by the two receiving portions 22 and the supporting portion 32. Advantageously, the calibrating device according to the embodiment of the invention can be used by various RC aircrafts.

Based on the above structures, the features of the calibrating device of the embodiment of the invention are described below.

Figure 9:
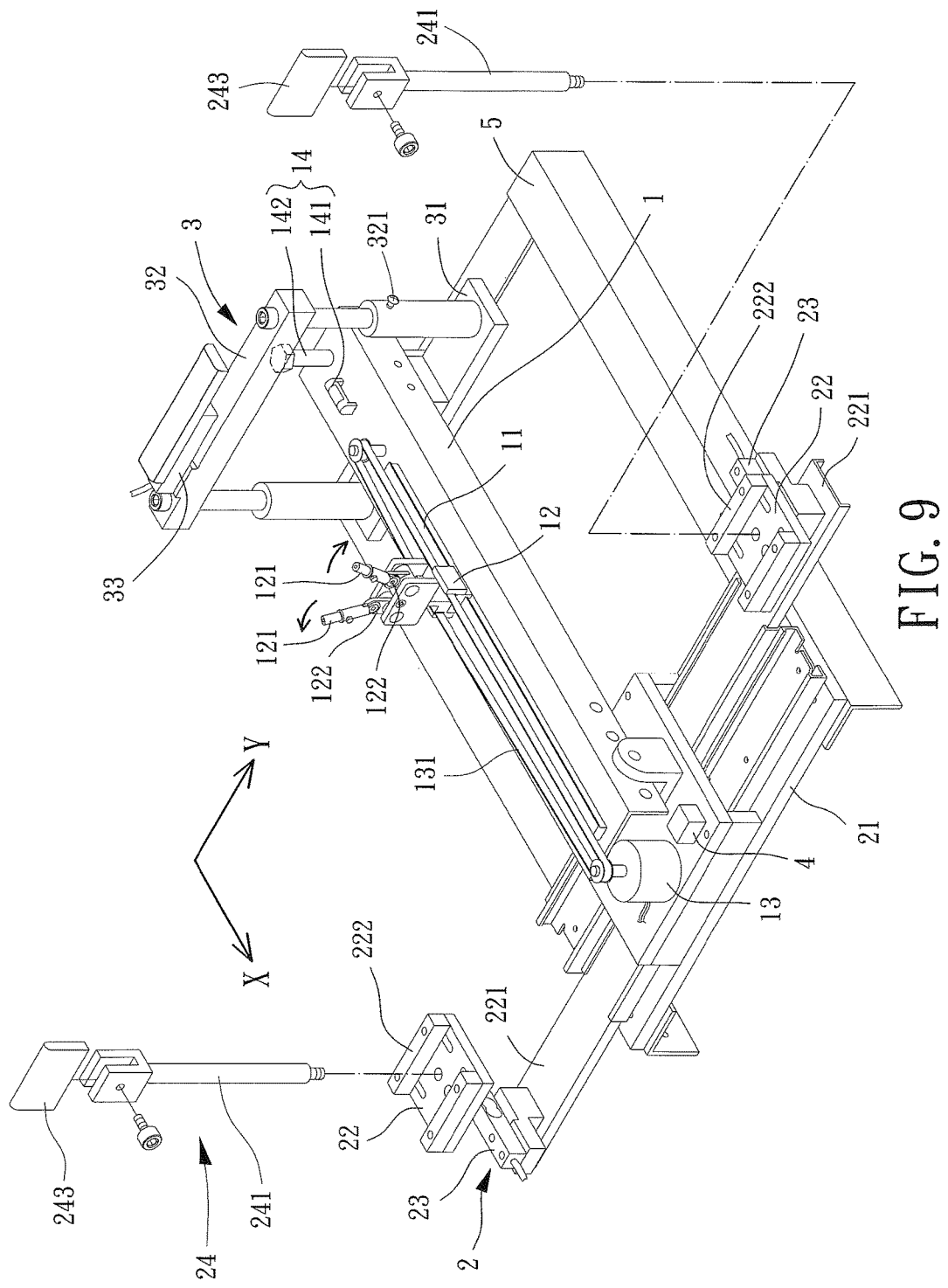
FIG. 9 shows the calibrating device of the embodiment of the invention where each of the two posts of the auxiliary support is shown to be in detachable attachment to a transverse brace.
Figure 10:
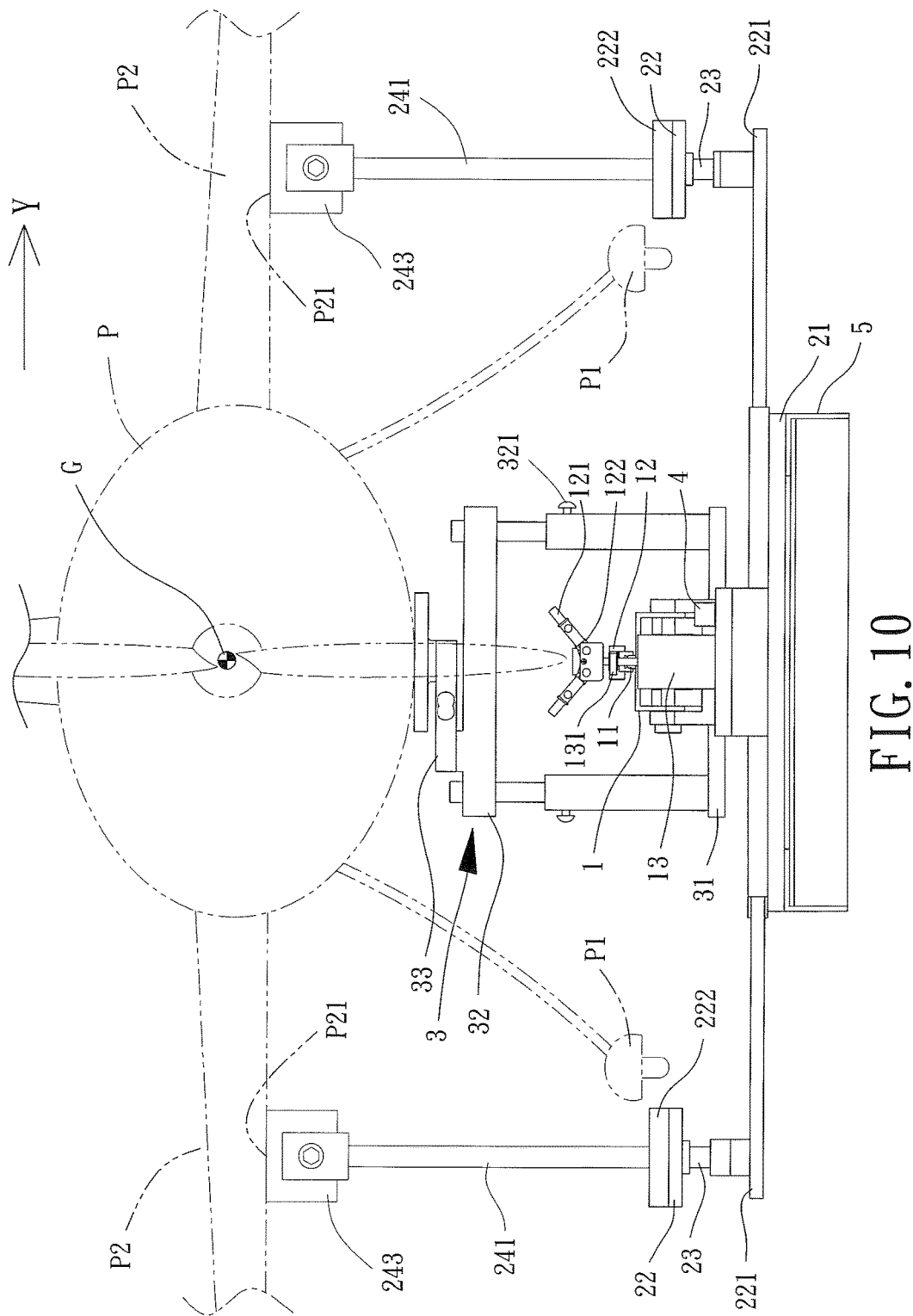
FIG. 10 is a front view of the calibrating device of the embodiment of the invention where each of the two posts of the auxiliary support is shown to support an airfoil of the aircraft.
Figure 11:
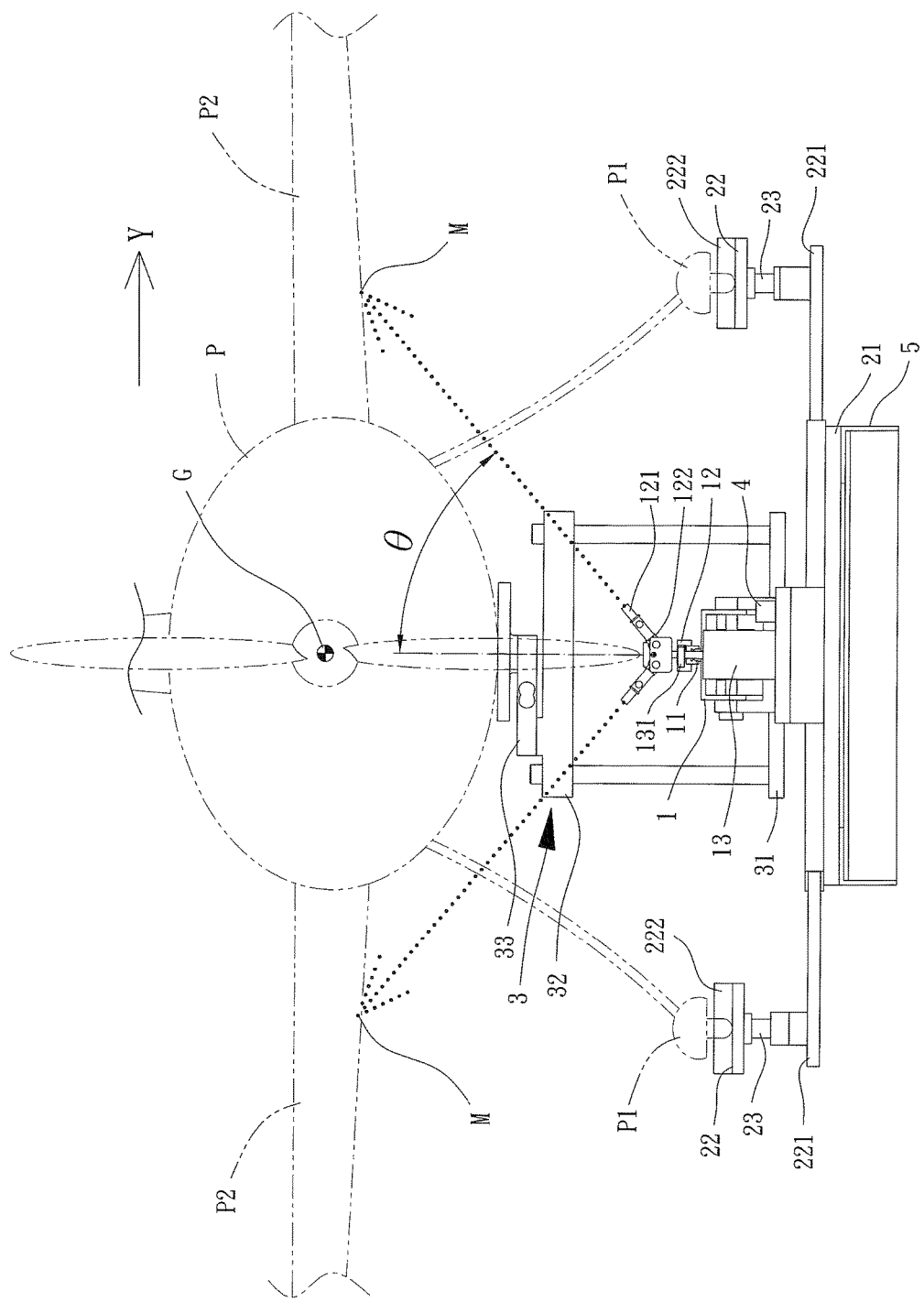
FIG. 11 is another front view of the calibrating device of the embodiment of the invention when used to support the aircraft.

Although the two receiving portions 22 are used to support the two main wheels P1, the transverse bar 242 in the embodiment is detachably attached to the two posts 241 as shown in FIG. 2. Referring to FIGS. 9 and 10 also, the transverse bar 242 can be removed from the two posts 241 while the two posts 241 remain engaged with the two receiving portions 22, respectively. Thus, the end of the post 241 that is away from the receiving portion 22 can be used to support an airfoil P2 of the aircraft "P." In other words, the two posts 241 can be used to support the airfoils P2 of the aircraft "P," respectively. A transverse brace 243 can be detachably attached to each post 241. The transverse brace 243 may be a support which is a flat board or which has an "L" or other shape. The transverse brace 243 may extend in parallel to the transverse axis "Y" to ensure that the post 241 can support the airfoil P2 at a proper location P21. However, the location P21 is not limited thereto.

It can be known from the above description that the CG location "G" will be between the first support 2 and the second support 3 as long as the distance between the first support 2 and the second support 3 is larger than the distance D2 (the distance between the CG location "G" and the first support 2 in the longitudinal axis "X"). In this situation, the aircraft "P" can be stably supported by the two posts 241 of the first support 2 and the supporting portion 32 of the second support 3. As such, the control unit 4 can calculate the total weight "W" and the CG location "G" of the aircraft "P" regardless of whether the first support 2 is used to support the two main wheels P1 or the two airfoils P2 (based on the equation (1) above). Therefore, no matter whether the two receiving portions 22 are used to support the two main wheels P1 of the aircraft "P" or used to support the two airfoils P2 through the two posts 241, the calibrating device of the embodiment of the invention is able to measure the total weight "W" and the CG location "G" of the aircraft "P" for subsequent calibration. Therefore, in the case where the two main wheels P1 of the aircraft "P" cannot be supported by the two receiving portions 22 (such as the aircraft "P" is a glider that has no wheels), the two airfoils P2 of the aircraft "P" can be supported by the two posts 241 to perform the measurement of the aircraft "P." Thus, the utility of the calibrating device of the embodiment of the invention is improved. Furthermore, although the two airfoils P2 of the aircraft "P" are supported by the two posts 241, the aircraft "P" is still supported by three fulcrums of the two posts 241 and the supporting portion 32. Advantageously, the production complexity of the calibrating device is reduced, and the utility thereof is improved.

Referring to FIG. 6, when it is desired to use the calibrating device of the embodiment of the invention to measure the weight WP2, the CG location GP2, or the moment of inertia Ic of the airfoil P2, it is simply required to remove the transverse braces 243 from the posts 241 and to place the transverse bar 242 back to the posts 241.

Referring to FIGS. 2, 3, 4 and 11, since the pointer 121 is coupled with the slider 12 via a pivoting member 122 and is able to pivot about the crossbar 1, the pointer 121, which is perpendicular to the crossbar 1 (i.e. perpendicular to the longitudinal axis "X"), can pivot from the CG location "G" of the aircraft "P" by an angle $\theta$ to point to a reference point "M" on the airfoil P2 or the fuselage. Then, the calibration of the CG location "G" can be proceeded accordingly, providing a convenient calibration of the aircraft "P." The reference point "M" may be an intersection point between the mean aerodynamic chord and the CG location "G" along the line perpendicular to the longitudinal axis "X." However, the angle $\theta$ can be adjusted according to the user's requirement. In this regard, the reference point "M" may also be located on the root or tip of the airfoil P2 (i.e. the intersection point between a line passing through the CG location "G" along the transverse axis "Y" and another line passing through the root or tip of the airfoil P2).

It is noted that the crossbar 1 should remain horizontal along the longitudinal axis "X." However, when it is desired to use the calibrating device of the embodiment of the invention in an aerodrome, it would be difficult to ensure that the ground (or any surface) on which the bottom frame 5 is placed is horizontal. If the ground is not horizontal, the measured CG location "G" of the aircraft "P" tends to have an error. In light of this deficiency, the crossbar 1 may further include a horizontal level adjustment portion 14 as shown in FIGS. 2 and 5. The horizontal level adjustment portion 14 may include a level 141 which may be mounted on the surface of the crossbar 1. The level 141 is able to show whether the crossbar 1 is horizontal along the longitudinal axis "X." If the crossbar 1 is not horizontal, the user can adjust the crossbar 1 until the crossbar 1 is horizontal. The horizontal level adjustment portion 14 may further include a height adjustment member 142 in abutment with the bottom frame 5 for adjusting the distance between the crossbar 1 and the bottom frame 5. For example, in the embodiment, the height adjustment member 142 may be a screw rod arranged at the end of the crossbar 1 adjacent to the second support 3 for adjusting the distance between the end of the crossbar 1 and the bottom frame 5. As such, when the bottom frame 5 is placed on a non-horizontal surface, the user can adjust the distance between the crossbar 1 and the bottom frame 5 until the crossbar 1 is horizontal.

Referring to FIGS. 2, 3, 4 and 5, at least one positioning portion 222 may be arranged on the surface of each receiving portion 22. Each of the at least one positioning portion 222 may be in the form of a blocker or a protrusion that blocks. When the at least one positioning portion 222 includes only one positioning portion 222, the positioning portion 222 is arranged at one of the two edges of the receiving portion 22 parallel to the transverse axis "Y." When the at least one positioning portion 222 includes two positioning portions 222, the two positioning portions 222 are respectively arranged at the two edges of the receiving portion 22 parallel to the transverse axis "Y." In this arrangement, when the main wheel P1 of the aircraft "P" is placed on the receiving portion 22, the wheel P1 may be positioned by the at least one positioning portion 222, preventing the main wheel P1 from rolling on the surface of the receiving portion 22.

Figure 12:
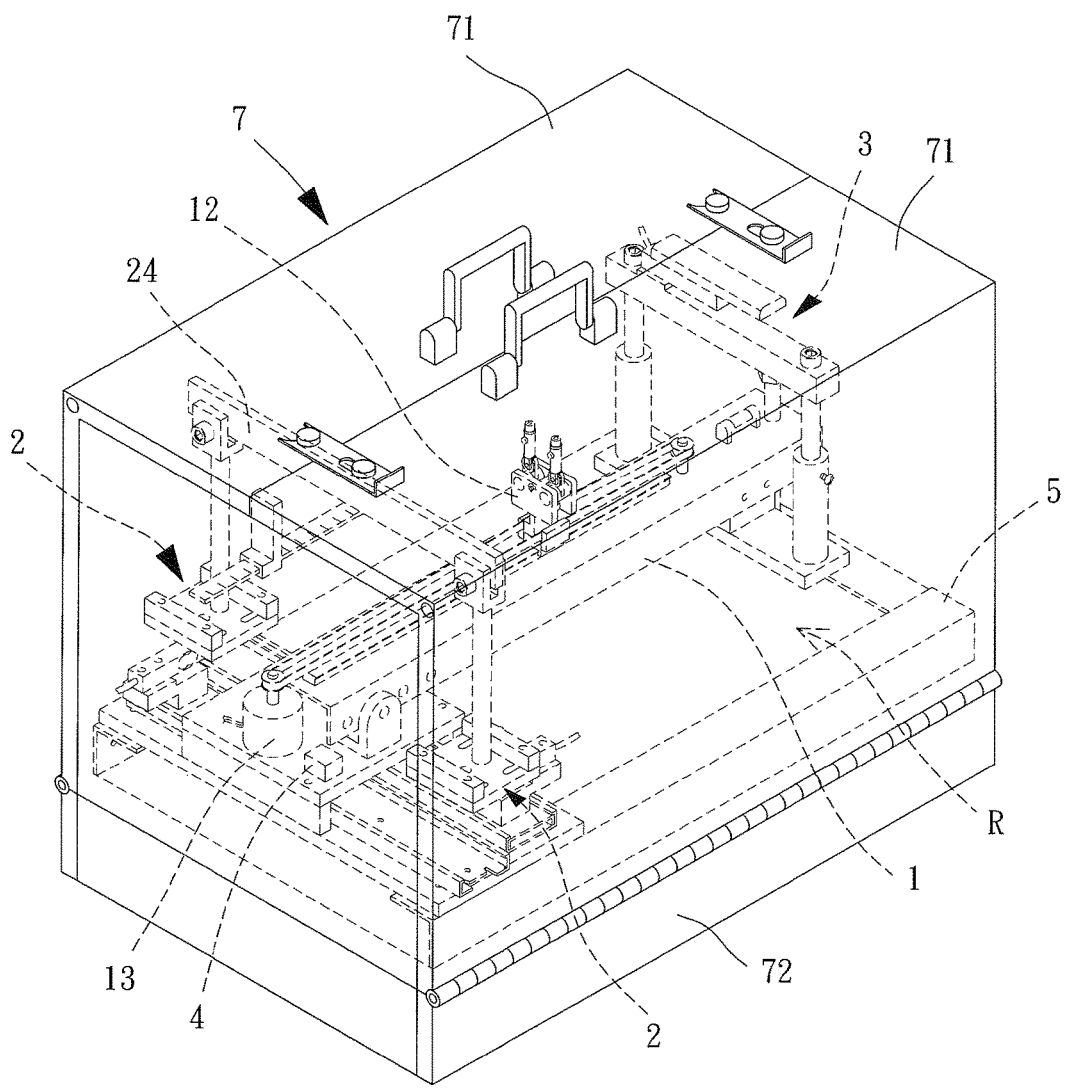
FIG. 12 is a perspective view of the calibrating device of the embodiment of the invention when arranged in a box.

Referring to FIG. 12, the calibrating device of the embodiment of the invention may further include a box 7. The box 7 includes a plurality of lateral boards 71 and a bottom board 72. The bottom board 72 may be fixed to the bottom frame 5. Each of the plurality of lateral boards 71 is pivotally coupled with the bottom board 72. A chamber "R" may be formed between the plurality of lateral boards 71 and the bottom board 72. The crossbar 1, the first support 2, the second support 3, the control unit 4 and the bottom frame 5 can be placed in the chamber "R" for carriage of the calibrating device. Thus, damage to the calibrating device during the carriage is avoided, and convenient carriage of the calibrating device is attained.

Figure 13:
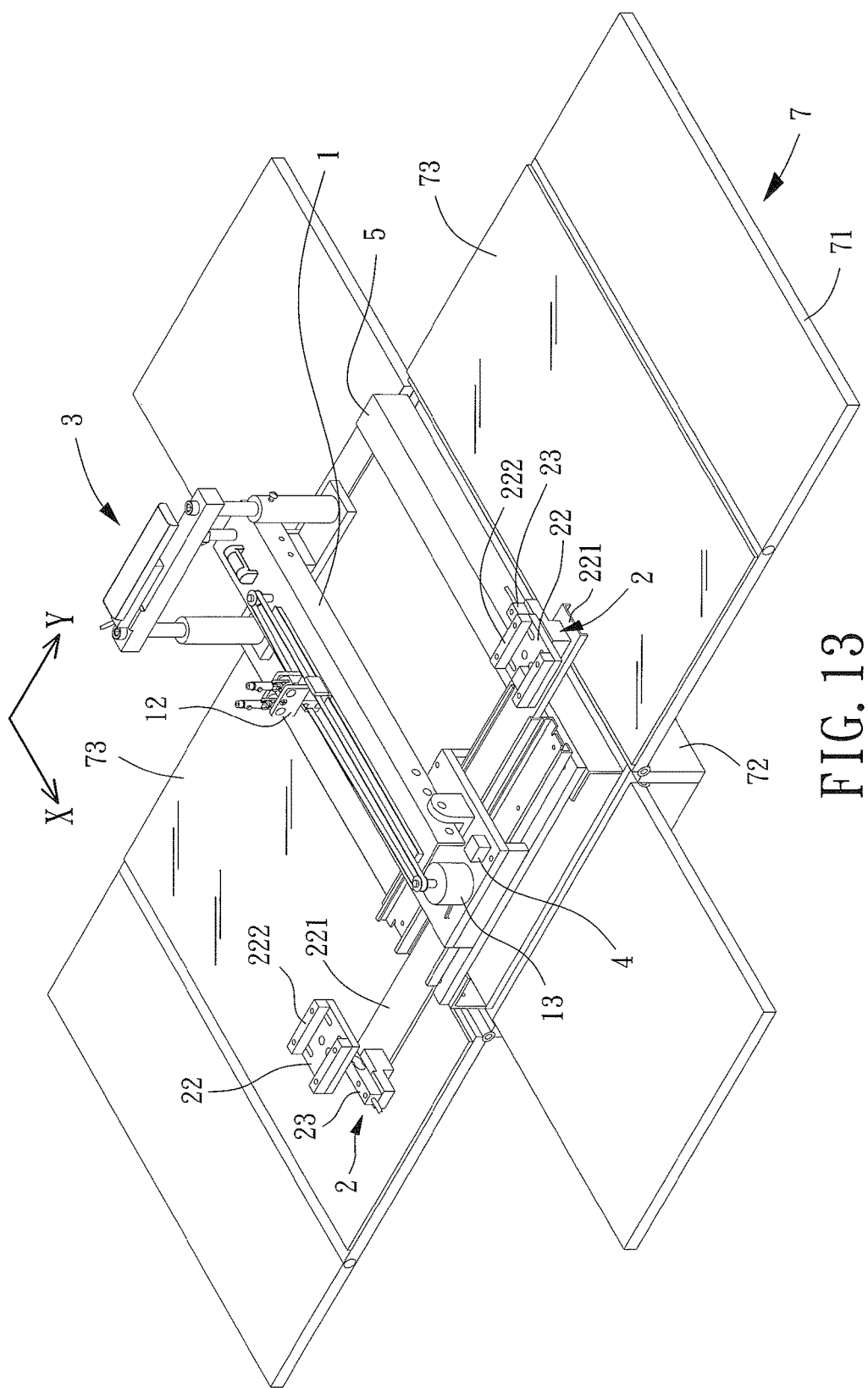
FIG. 13 shows the calibrating device of the embodiment of the invention when the box is in an open state.
Figure 14:
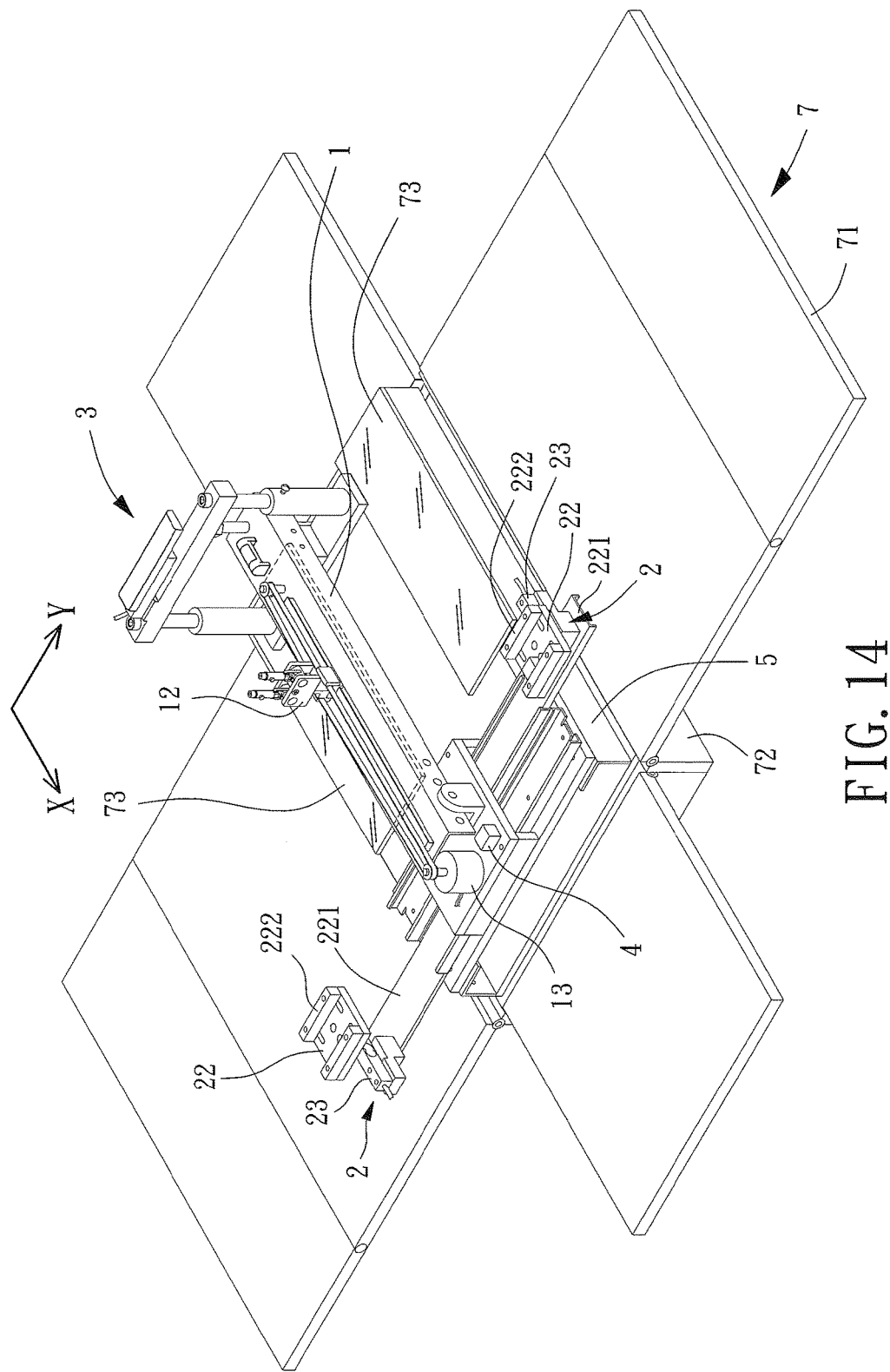
FIG. 14 shows the calibrating device of the embodiment of the invention where a mirror is shown to be arranged between two opposite lateral boards when the box is in the open state.

Referring to FIG. 13, when it is desired to carry the calibrating device to a desired place, the box 7 may be opened by pivoting each of the plurality of lateral boards 71 relative to the bottom board 72. As such, the crossbar 1, the first support 2, the second support 3, the control unit 4 and the bottom frame 5 can be operated by the user for calibration purposes. At least one of the plurality of lateral boards 71 may be provided with a mirror 73 facing the chamber "R." In this arrangement, when the aircraft "P" (or the airfoil P2) is placed on the First support 2 and the second support 3, the mirror 73 can reflect the bottom image of the aircraft "P" (or the airfoil P2). Thus, the user is able to view the bottom surface of the aircraft "P" (or the airfoil P2) from above, thus identifying the CG location "G" (or GP2) indicated by the pointer 121. Thus, the user does not have to stoop so low to check under the aircraft "P" (or the airfoil P2) for the CG location "G" (or GP2), providing a convenient use of the calibrating device. On the other hand, referring to FIG. 14, the mirror 73 may also be arranged between two opposite lateral boards 71. For example, the mirror 73 may also be arranged on the bottom frame 5. Alternatively, the mirror 73 may be arranged on the surface of the bottom board 72 or placed under the crossbar 1 to reflect the bottom image of the aircraft "P" (or the airfoil. P2).

Figure 15:
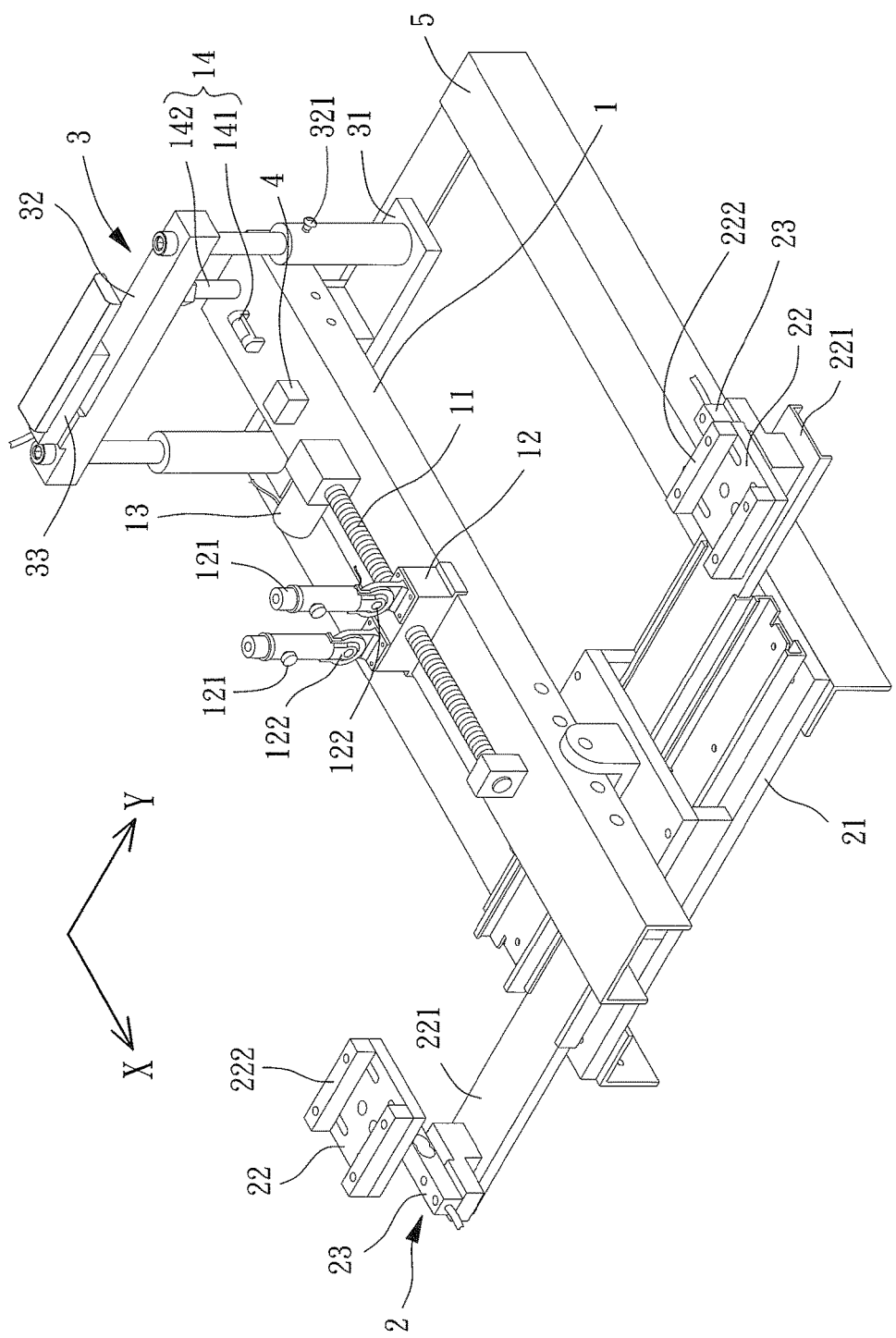
FIG. 15 shows the calibrating device of the embodiment of the invention where the slider is in threaded engagement with the longitudinal rail.

Although it has been described in the above embodiment that the drive member 13 drives the belt 131 to rotate so that the slider 12 is driven by the belt 131 to reciprocate along the longitudinal rail 11, the longitudinal rail 11 may be a screw rod and the slider 12 may be a screw tube as shown in FIG. 15. In this regard, the slider 12 may be screwed to the longitudinal rail 11 so that the position of the slider 12 relative to the longitudinal rail 11 is adjustable. The drive member 13 may be a motor coupled with the longitudinal rail 11. In this arrangement, the drive member 13 can be rotated in a clockwise or counterclockwise direction to drive the slider 12 to reciprocate along the longitudinal rail 11. From the above description, the drive member 13 can drive the slider 12 through a belt or a screw rod. However, other transmission mechanisms (such as gear wheels or racks) may also be used to drive the slider 12 to reciprocate along the longitudinal rail 11. However, it is not used to limit the invention.

Figure 16:
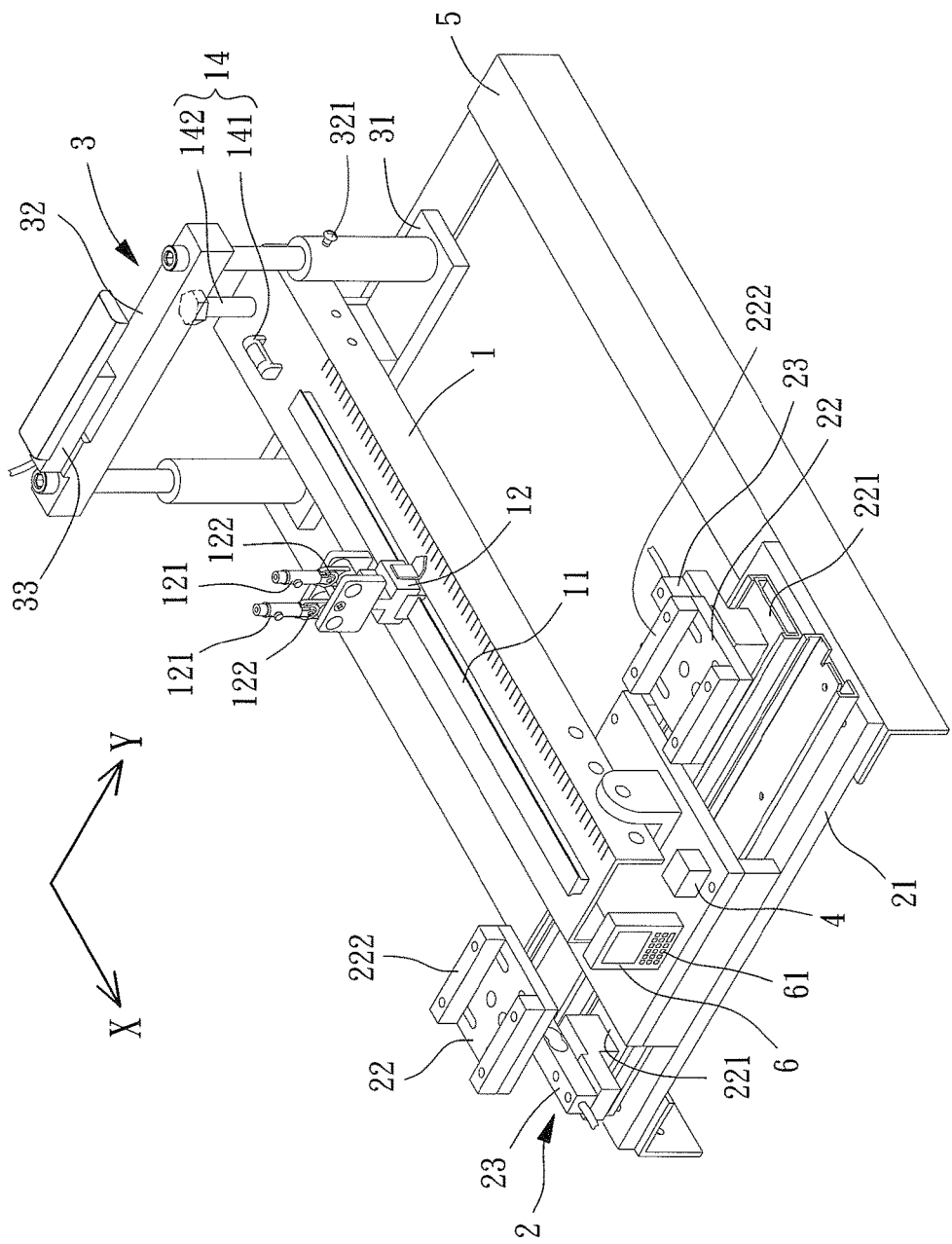
FIG. 16 shows the calibrating device of the embodiment of the invention where the crossbar is shown to include a scale ruler.

Furthermore, although it has been described in the above embodiment that the crossbar 1 is provided with a drive member 13 that drives the slider 12 to reciprocate along the longitudinal rail 11, the crossbar 1 may also include a scale ruler 15 arranged along the longitudinal rail 11 as shown in FIG. 16. As such, the distance between the slider 12 and the first support 2 or between the slider 12 and the second support 3 can be read from the scale ruler 15. Based on this, the control unit 4 is coupled with an output device 6. In such an arrangement, the drive member 13 is no longer needed for the crossbar 1.

Specifically, the first support 2 and the second support 3 can also support an aircraft "P," and the control unit 4 is also able to measure the total weight "W" and the CG location "G" of the aircraft "P." The detailed measuring processes have been described above. After the control unit 4 calculates the total weight "W" and the CG location "G" of the aircraft "P," the calculated results can be displayed by the output device 6. At this time, based on the displayed results of the output device 6 and the indicated value of the scale ruler 15, the user can push the slider 12 to slide along the longitudinal rail 11 in order for the pointer 121 of the slider 12 to point to the CG location "G." Based on this, the user is able to know the CG location "G" as indicated by the pointer 121.

Likewise, the auxiliary support 24 can also be mounted to the two receiving portions 22 of the first support 2, such that the auxiliary support 24 of the first support 2 and the supporting portion 32 of the second support 3 can be used to support an airfoil P2. In this regard, the control unit 4 is able to measure the total weight and the CG location GP2 of the airfoil P2. The detailed measuring processes have been described above. Accordingly, the user can calculate the moment of inertia Ic of the airfoil P2 based on the weight WP2 and the CG location GP2, allowing the user also to calibrate the weight WP2 and the CG location GP2 of the airfoil P2. Besides, the output device 6 may also include an input unit 61, and the information regarding half of the width of the fuselage "B" of the aircraft "P" and the distance "A" between the slider 242b and the first support 2 can be inputted to the control unit 4 through the input unit 61. Thus, the control unit 4 can directly calculate the moment of inertia Ic and output the calculated result to the moment of inertia Ic via the output device 6, further improving the utility of the calibrating device of the embodiment of the invention.

In summary, the calibrating device of the embodiment of the invention uses the two receiving portions 22 of the first support 2 to support the two main wheels P1 or the two airfoils P2 of the aircraft "P," and uses the supporting portion 32 of the second support 3 to support the fuselage of the aircraft "P," thereby supporting the aircraft "P." As such, the weight W and the CG location "G" can be measured. Then, the pointer 121 of the crossbar 1 is driven until the pointer 121 points to the CG location "G." As such, the length of the crossbar 1 may be significantly reduced as compared with the crossbar 92 of the conventional calibrating device. Advantageously, the volume and weight of the calibrating device of the embodiment of the invention can be reduced, attaining a convenient carriage of the calibrating device of the embodiment of the invention.

Furthermore, since the two receiving portions 22 of the first support 2 and the supporting portion 32 of the second support 3 are used as three fulcrums for supporting the aircraft "P," the first support 2 and the second support 3 are able to stably support the aircraft "P" without having to use the clamping member 921 of the conventional calibrating device 9. Thus, the production complexity of the calibrating device of the embodiment of the invention is reduced, and the utility of said calibrating device is improved.

On the other hand, the first support 2 of the calibrating device according to the embodiment of the invention may be provided with an auxiliary support 24. The auxiliary support 24 and the supporting portion 32 may be used to support one of the two airfoils P2 such that the control unit 4 can measure the weight WP2 and the CG location GP2 of the airfoil P2. Based on the measured results, the moment of inertia Ic of the airfoil P2 with respect to the central axis "C" can be calculated, and the user is able to also calibrate the weight WP2 and the CG location GP2 of the airfoil P2 based on the calculated result. Thus, the utility of the calibrating device of the embodiment of the invention is improved.

Since a factory-fresh RC aircraft requires a further assembly of some components such as an engine, a motor, an oil tank, a battery, several servers and some pull rods which have different weights due to different brands or specifications, the assembly of such components often leads to being overweight or to an improper CG location of the RC aircraft. Since the weight and CG location of the aircraft are critical to the performance, it is preferred to conduct the simulated assembly of the aircraft to determine which types and brands of the components are suitable for the formal assembly of the aircraft and what locations they should be placed. In this regard, the calibrating device of the embodiment of the invention is able to provide three fulcrums for supporting a measured object, so that the RC aircraft can be stably placed on the first support 2 and the second support 3 to perform the simulated assembly. At the same time, the control unit 4 can instantly measure the total weight and CG location of the RC aircraft, allowing the user to determine the types of the components to be used and the location of each component. As such, it can be ensured that the assembled aircraft can have desired weight and CG location. Thus, the calibrating device of the embodiment of the invention is able to increase the rate of successful assembly of the RC aircraft.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A calibrating device for measuring and calibrating a center of gravity of a remote control aircraft or an airfoil thereof, comprising:
    a crossbar arranged along a longitudinal axis and comprising a longitudinal rail and a slider movably engaged with the longitudinal rail, wherein the longitudinal rail is arranged in an extending direction of the crossbar, wherein the crossbar further comprises a drive member coupled with the longitudinal rail or the slider and driving the slider to move along the longitudinal rail, and wherein the slider comprises a pointer;
    a first support comprising a seat, two receiving portions and an auxiliary support, wherein the two receiving portions are arranged on the seat and are movable along a transverse axis perpendicular to the longitudinal axis, wherein the two receiving portions are aligned with each other along the transverse axis, wherein each of the two receiving portions comprises a load cell, and wherein the auxiliary support is detachably arranged on the two receiving portions;
    a second support comprising a base and a supporting portion arranged on the base, wherein the supporting portion comprises a load cell; and
    a control unit electrically coupled with the drive member of the crossbar, the two load cells of the first support, and the load cell of the second support,
    wherein the first and second supports are configured to jointly support the remote control aircraft or the airfoil thereof, wherein the center of gravity of the remote control aircraft or the airfoil thereof is located between the first and second supports along the longitudinal axis.

2. The calibrating device for measuring and calibrating the center of gravity of the remote control aircraft or the airfoil thereof as claimed in claim 1, wherein the crossbar is located at a center between the two receiving portions along the transverse axis.

3. The calibrating device for measuring and calibrating the center of gravity of the remote control aircraft or the airfoil thereof as claimed in claim 1, wherein the two receiving portions of the first support are adapted to respectively support two main wheels of the remote control aircraft, wherein the supporting portion of the second support is adapted to support a fuselage of the remote control aircraft, wherein the control unit receives and adds weight information of the three load cells of the first and second supports to calculate a total weight of the remote control aircraft, and wherein the control unit calculates the location of the center of gravity of the remote control aircraft.

4. The calibrating device for measuring and calibrating the center of gravity of the remote control aircraft or the airfoil thereof as claimed in claim 3, wherein the first and second supports are spaced from each other along the longitudinal axis for a distance larger than a distance between the location of the center of gravity and the first support along the longitudinal axis.

5. A calibrating device for measuring and calibrating a center of gravity of a remote control aircraft or an airfoil thereof comprising:
- a crossbar arranged along a longitudinal axis and comprising a longitudinal rail and a slider movably engaged with the longitudinal rail, wherein the longitudinal rail is arranged in an extending direction of the crossbar, wherein the crossbar further comprises a drive member coupled with the longitudinal rail or the slider and driving the slider to move along the longitudinal rail, and wherein the slider comprises a pointer;
- a first support comprising a seat, two receiving portions and an auxiliary support, wherein the two receiving portions are arranged on the seat and are movable along a transverse axis perpendicular to the longitudinal axis, wherein the two receiving portions are aligned with each other along the transverse axis, wherein each of the two receiving portions comprises a load cell, and wherein the auxiliary support is detachably arranged on the two receiving portions;
- a second support comprising a base and a supporting portion arranged on the base, wherein the supporting portion comprises a load cell; and
- a control unit electrically coupled with the drive member of the crossbar, the two load cells of the first support, and the load cell of the second support,
- wherein the auxiliary support comprises two posts, wherein each of the two posts is detachably arranged on a respective one of the two receiving portions, wherein a transverse brace is detachably attached to each of the two posts, wherein the transverse braces of the two posts are adapted to respectively support two airfoils of the remote control aircraft, wherein the supporting portion of the second support is adapted to support a fuselage of the remote control aircraft, wherein the control unit receives and adds weight information of the three load cells of the first and second supports to calculate a total weight of the remote control aircraft, and wherein the control unit calculates the location of the center of gravity of the remote control aircraft.

6. The calibrating device for measuring and calibrating the center of gravity of the remote control aircraft or the airfoil thereof as claimed in claim 1, wherein the pointer is coupled with the slider via a pivoting member.

7. The calibrating device for measuring and calibrating the center of gravity of the remote control aircraft or the airfoil thereof as claimed in claim 1, wherein a level is arranged on a surface of the crossbar.

8. The calibrating device for measuring and calibrating the center of gravity of the remote control aircraft or the airfoil thereof as claimed in claim 1, further comprising a bottom frame, wherein the crossbar further comprises a height adjustment member abutting against the bottom frame to adjust a height of the crossbar.

9. The calibrating device for measuring and calibrating the center of gravity of the remote control aircraft or the airfoil thereof as claimed in claim 1, wherein the auxiliary support of the first support further comprises a transverse bar, wherein the second support and the transverse bar are adapted to support the airfoil of the remote control aircraft, wherein the control unit receives and adds weight information of the three load cells of the first and second supports to calculate a total weight of the airfoil, and wherein the control unit calculates the location of the center of gravity of the airfoil.

10. The calibrating device for measuring and calibrating the center of gravity of the remote control aircraft or the airfoil thereof as claimed in claim 9, wherein the transverse bar of the auxiliary support further comprises a gauge and a slider slidably coupled with the gauge, wherein the gauge is relatively adjacent to the first support and relatively distant to the second support along the longitudinal axis, wherein a root of the airfoil abuts against the slider of the transverse bar, and wherein the gauge is provided with graduations showing a distance between the slider of the transverse bar and the first support.

11. The calibrating device for measuring and calibrating the center of gravity of the remote control aircraft or the airfoil thereof as claimed in claim 1, wherein the supporting portion of the second support is provided with a height adjustment portion.

12. The calibrating device for measuring and calibrating the center of gravity of the remote control aircraft or the airfoil thereof as claimed in claim 1, further comprising a box having a plurality of lateral boards and a bottom board, wherein each of the plurality of lateral boards is pivotally coupled with the bottom board, wherein a chamber is formed between the plurality of lateral boards and the bottom board, and wherein the crossbar, the first support, the second support and the control unit are received in the chamber.

13. The calibrating device for measuring and calibrating the center of gravity of the remote control aircraft or the airfoil thereof as claimed in claim 12, wherein a mirror is arranged on one of the plurality of lateral boards or arranged between two opposite lateral boards of the plurality of lateral boards, and wherein the mirror faces the chamber.

14. A calibrating device for measuring and calibrating a center of gravity of a remote control aircraft or an airfoil thereof, comprising:
- a crossbar arranged along a longitudinal axis and comprising a longitudinal rail and a slider movably engaged with the longitudinal rail, wherein the longitudinal rail is arranged in an extending direction of the crossbar, wherein the slider comprises a pointer, and wherein the crossbar further comprises a scale ruler arranged along the longitudinal rail;
- a first support comprising a seat, two receiving portions and an auxiliary support, wherein the two receiving portions are arranged on the seat and are movable along a transverse axis perpendicular to the longitudinal axis, wherein the two receiving portions are aligned with each other along the transverse axis, wherein each of the two receiving portions comprises a load cell, and wherein the auxiliary support is detachably arranged on the two receiving portions;
a second support comprising a base and a supporting portion arranged on the base, wherein the supporting portion comprises a load cell; and
a control unit electrically coupled with the three load cells of the first and second supports, and an output device,
wherein the first and second supports are configured to jointly support the remote control aircraft or the airfoil thereof, wherein the center of gravity of the remote control aircraft or the airfoil thereof is located between the first and second supports along the longitudinal axis.

15. The calibrating device for measuring and calibrating the center of gravity of the remote control aircraft or the airfoil thereof as claimed in claim 14, wherein the crossbar is located at a center between the two receiving portions along the transverse axis.

16. The calibrating device for measuring and calibrating the center of gravity of the remote control aircraft or the airfoil thereof as claimed in claim 14, wherein the two receiving portions of the first support are adapted to respectively support two main wheels of the remote control aircraft, wherein the supporting portion of the second support is adapted to support a fuselage of the remote control aircraft, wherein the control unit receives and adds weight information of the three load cells of the first and second supports to calculate a total weight of the remote control aircraft, wherein the control unit calculates the location of the center of gravity of the remote control aircraft, and wherein the control unit outputs information regarding the calculated total weight and the calculated location of the center of gravity through the output device.

17. The calibrating device for measuring and calibrating the center of gravity of the remote control aircraft or the airfoil thereof as claimed in claim 16, wherein the first and second supports are spaced from each other along the longitudinal axis for a distance larger than a distance between the location of the center of gravity and the first support along the longitudinal axis.

18. The calibrating device for measuring and calibrating the center of gravity of the remote control aircraft or the airfoil thereof as claimed in claim 14, wherein the auxiliary support comprises two posts, wherein each of the two posts is detachably arranged on a respective one of the two receiving portions, wherein a transverse brace is detachably attached to each of the two posts, wherein the two transverse braces of the two posts are adapted to respectively support two airfoils of the remote control aircraft, wherein the supporting portion of the second support is adapted to support a fuselage of the remote control aircraft, wherein the control unit receives and adds weight information of the three load cells of the first and second supports to calculate a total weight of the remote control aircraft, and wherein the control unit calculates the location of the center of gravity of the remote control aircraft.

19. The calibrating device for measuring and calibrating the center of gravity of the remote control aircraft or the airfoil thereof as claimed in claim 14, wherein the pointer is coupled with the slider via a pivoting member.

20. The calibrating device for measuring and calibrating the center of gravity of the remote control aircraft or the airfoil thereof as claimed in claim 14, wherein the auxiliary support of the first support further comprises a transverse bar, wherein the second support and the transverse bar are adapted to support the airfoil of the remote control aircraft, wherein the control unit receives and adds weight information of the three load cells of the first and second supports to calculate a total weight of the airfoil, wherein the control unit calculates the location of the center of gravity of the airfoil, and wherein the control unit outputs information regarding the calculated total weight and the calculated location of the center of gravity through the output device.

21. The calibrating device for measuring and calibrating the center of gravity of the remote control aircraft or the airfoil thereof as claimed in claim 20, wherein the transverse bar of the auxiliary support further comprises a gauge and a slider slidably coupled with the gauge, wherein the gauge is relatively adjacent to the first support and relatively distant to the second support along the longitudinal axis, wherein a root of the airfoil abuts against the slider of the auxiliary support, and wherein the gauge is provided with graduations showing a distance between the slider of the transverse bar and the first support.

22. The calibrating device for measuring and calibrating the center of gravity of the remote control aircraft or the airfoil thereof as claimed in claim 14, wherein the supporting portion of the second support is provided with a height adjustment portion.

* * * * *